(12) United States Patent
Seok

(10) Patent No.: US 11,025,876 B2
(45) Date of Patent: Jun. 1, 2021

(54) METHOD AND DEVICE FOR CONTROLLING WHITE BALANCE FUNCTION OF ELECTRONIC DEVICE

(71) Applicant: Samsung Electronics Co., Ltd., Suwon-si (KR)

(72) Inventor: Jin Keun Seok, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/497,224

(22) PCT Filed: Mar. 22, 2018

(86) PCT No.: PCT/KR2018/003333
§ 371 (c)(1),
(2) Date: Sep. 24, 2019

(87) PCT Pub. No.: WO2018/174581
PCT Pub. Date: Sep. 27, 2018

(65) Prior Publication Data
US 2020/0053332 A1 Feb. 13, 2020

(30) Foreign Application Priority Data
Mar. 24, 2017 (KR) .................. 10-2017-0037653

(51) Int. Cl.
*H04N 9/73* (2006.01)
*H04N 5/232* (2006.01)

(52) U.S. Cl.
CPC ......... *H04N 9/735* (2013.01); *H04N 5/23219* (2013.01)

(58) Field of Classification Search
CPC .................................................. H04N 5/23219
(Continued)

(56) References Cited
U.S. PATENT DOCUMENTS

2003/0235333 A1 12/2003 Lin
2009/0021602 A1* 1/2009 Fujiwara ............ H04N 5/23219
348/223.1
(Continued)

FOREIGN PATENT DOCUMENTS

JP 2009-71454 A 4/2009
JP 2011-188186 A 9/2011
(Continued)

*Primary Examiner* — Joel W Fosselman
(74) *Attorney, Agent, or Firm* — Jefferson IP Law, LLP

(57) ABSTRACT

Disclosed in various embodiments of the present invention are a method and a device for correcting white balance during image capturing in an electronic device. According to the various embodiments of the present invention, a display and a processor functionally connected with the display are comprised, wherein the processor can be configured so as to: acquire an image including one or more objects; determine a first area corresponding to a face among the one or more objects in the image; determine a second area corresponding to the background among the one or more objects; confirm the ratio between color information of the first area and color information of the second area; correct, on the basis of a first level, white balance corresponding to the first area if the ratio satisfies a set first condition; correct, on the basis of a second level, the white balance corresponding to the first area if the ratio satisfies a set second condition; and display, through the display, an image of which the white balance corresponding to the first area has been corrected on the basis of corresponding one level between the first level and the second level. Various embodiments are possible.

9 Claims, 15 Drawing Sheets

(58) Field of Classification Search
USPC ........................................................ 348/223.1
See application file for complete search history.

(56) References Cited

U.S. PATENT DOCUMENTS

| | | |
|---|---|---|
| 2009/0067683 A1 | 3/2009 | Takayama |
| 2013/0128073 A1 | 5/2013 | Seok et al. |
| 2015/0054980 A1 | 2/2015 | Nikkanen et al. |

FOREIGN PATENT DOCUMENTS

| | | |
|---|---|---|
| KR | 10-0751395 B1 | 8/2007 |
| KR | 10-2013-0056442 A | 5/2013 |
| KR | 10-2016-0027030 A | 3/2016 |

* cited by examiner (A)          (B)

METHOD AND DEVICE FOR CONTROLLING WHITE BALANCE FUNCTION OF ELECTRONIC DEVICE

TECHNICAL FIELD

Various embodiments of the present disclosure disclose a method and device for correcting white balance at image capturing in an electronic device.

BACKGROUND ART

With the recent advance of digital technologies, various types of electronic devices are being widely used such as mobile communication terminals, smart phones, tablet personal computers (PCs), notebooks, personal digital assistants (PDA), wearable devices, digital cameras, personal computers (PCs) or the like.

In recent years, an electronic device is providing not only a call function and a multimedia play function (e.g., music play and video play), but also an image capturing function. The electronic device is being developed to perform various image signal processing (e.g., color calibration processing, etc.) when providing the image capturing function, to obtain an image desired by a user. For example, the electronic device can express the most suitable color under any light source through an auto white balance (AWB) function. According to an embodiment, light entering a camera sensor (e.g., an image sensor) of the electronic device is varied according to the spectrum of a light source and the reflectance spectrum of a thing, and when a white or grey object is exposed to a low color temperature light source or a high color temperature light source, the white or grey object can be expressed in red under the low color temperature light source, and be expressed in blue under the high color temperature light source. To correct this (e.g., to express white in true white), an auto white balance function is being provided.

DISCLOSURE OF INVENTION

Technical Problem

However, the existing auto white balance function applies white balance to the entire image regardless of the existence or non-existence of a face in an image. Accordingly, in an image involving a face, for example, when the face exists under a high color temperature light source and the background exists under a lower color temperature light source, white balance is adjusted adaptive to the background and thus, a face color can be expressed differently (e.g., in blue) from the reality. Also, as the existing auto white balance function identically applies white balance even to an image including people having different skin colors such as the black, the white, the yellow, etc., there occurs a problem in which if putting a reference on any one of the black or the white (or the yellow) and applying white balance, the skin color of the black can be expressed yellowish compared with the reality and, on the contrary, the skin color of the white or the yellow is expressed bluish compared with the reality.

Various embodiments disclose a method and device for improving a function of white balance of an image captured in an electronic device.

Various embodiments disclose a method and device for obtaining an attribute (e.g., a human race) of a face area in an image, and controlling white balance on the basis of the obtained attribute.

Solution to Problem

An electronic device of various embodiments of the present disclosure may include a display, and a processor functionally coupled with the display, and the processor may be configured to acquire an image including one or more objects, identify a first area corresponding to a face among the one or more objects in the image, identify a second area corresponding to the background among the one or more objects, confirm a ratio between color information of the first area and color information of the second area, correct, on the basis of a first level, white balance corresponding to the first area in response to the ratio satisfying a set first condition, correct, on the basis of a second level, the white balance corresponding to the first area in response to the ratio satisfying a set second condition, and display, through the display, the image of which the white balance corresponding to the first area has been corrected on the basis of corresponding one level among the first level and the second level.

An electronic device of various embodiments of the present disclosure may include a camera module, a display, and a processor functionally coupled with the camera module and the display, and the processor may be configured to acquire an image including a face object, divide a background area and a face area in the image, identify an attribute of the face area, obtain a weight for correcting white balance on the basis of the attribute of the face area, correct the white balance on the basis of the weight, and display, through the display, the image on the basis of the corrected white balance.

An operation method of an electronic device of various embodiments of the present disclosure may include acquiring an image including one or more objects, identifying a first area corresponding to a face among the one or more objects in the image, identifying a second area corresponding to the background among the one or more objects, confirming a ratio between color information of the first area and color information of the second area, correcting, on the basis of a first level, white balance corresponding to the first area in response to the ratio satisfying a set first condition, correcting, on the basis of a second level, the white balance corresponding to the first area in response to the ratio satisfying a set second condition, and displaying, through the display, the image of which the white balance corresponding to the first area has been corrected on the basis of corresponding one level among the first level and the second level.

To fix the above drawbacks, various embodiments of the present disclosure may include a computer-readable recording medium recording a program for executing the method in a processor.

Advantageous Effects of Invention

An electronic device of various embodiments and an operating method thereof may obtain a face area from an image, and divide an attribute (e.g., a human race) corresponding to an object of the face area. According to various embodiments, white balance may be differentially provided on the basis of the attribute corresponding to the object of the face area in the image. Through this, in various embodiments, the performance of white balance of an image captured in an electronic device may be improved. According to various embodiments, in an image involving a face, as white balance is corrected through human race division, a skin color of a human race may be expressed closer to the original color. By the electronic device of various embodiments, contribution may be made to improving the usability, convenience, or utilization of the electronic device.

BEST MODE FOR CARRYING OUT THE INVENTION

Figure 1:
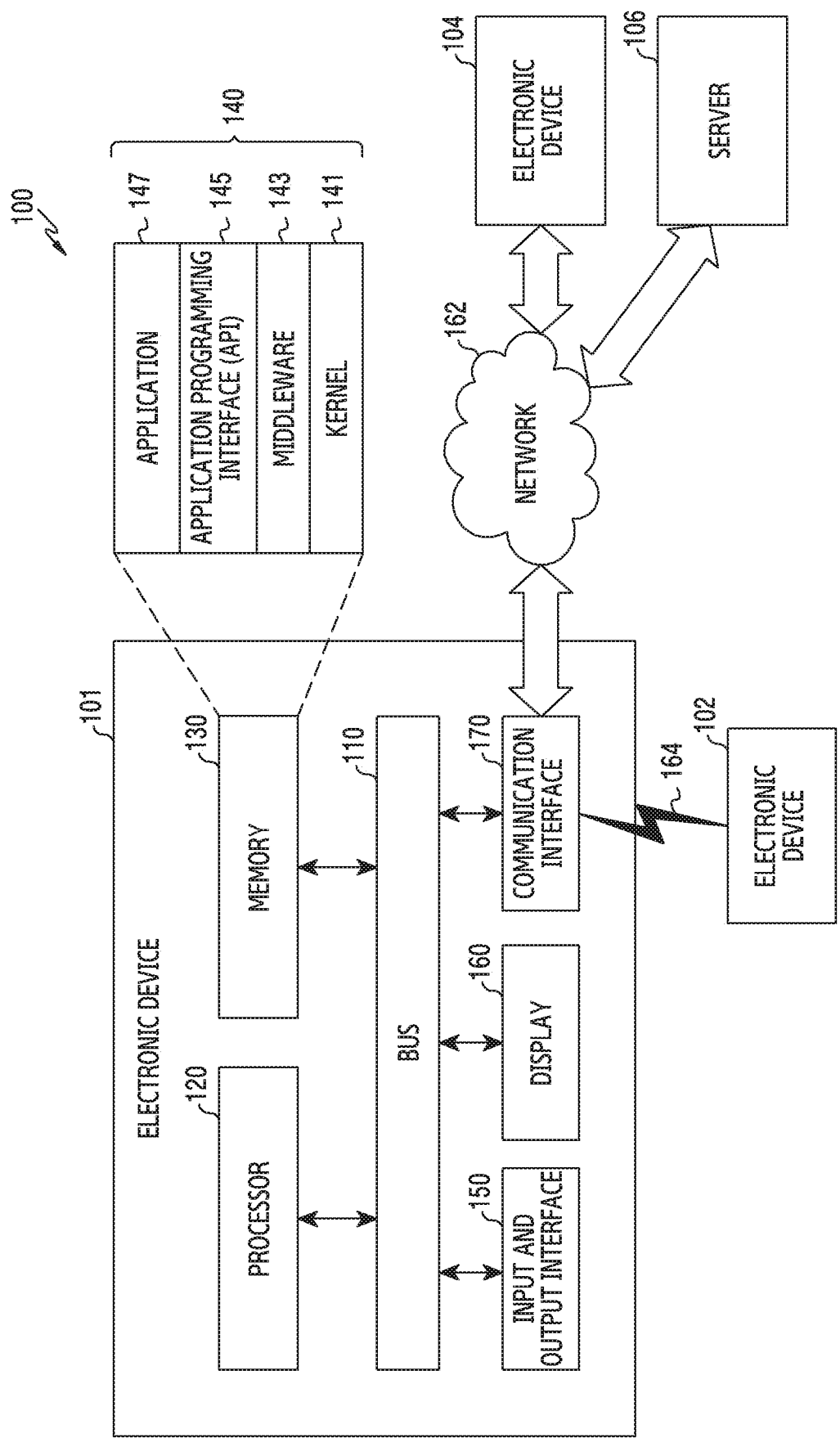
FIG. 1 is a diagram illustrating a network environment including an electronic device according to various embodiments of the present disclosure.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements.

The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit).

According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a block diagram of a network environment system according to an embodiment of the present disclosure.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element.

The bus 110 may, for example, include a circuit coupling the constituent elements 110, 120, 150, 160 and 170 with one another and forwarding communication (e.g., a control message or data) between the constituent elements.

The processor 120 may include one or more of a central processing unit (CPU), an application processor (AP) or a communication processor (CP). The processor 120 may, for example, execute operation or data processing for control and/or communication of at least one another constituent element of the electronic device 101. The processing (or control) operation of the processor 120 of various embodiments is described in detail with reference to the drawings described later.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS).

The memory 130 may store one or more programs executed by the processor 120, and may perform a function for temporarily storing inputted/outputted data as well. The inputted/outputted data may, for example, include data such as a video, an image (e.g., a photo), function (or application) execution related information, or an audio, etc. In accordance with various embodiments, the memory 130 takes charge of a role of storing acquired data. Data acquired in real time may be stored in a temporary storage device (e.g., a buffer), and data confirmed to be stored may be stored in a lasting storage device. The memory 130 may include a computer-readable recording medium recording a program for executing a method of various embodiments in the processor 120.

The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device. For example, the input/output interface 150 may include a wired/wireless headphone port, an external electric charger port, a wired/wireless data port, a memory card port, an audio input/output port, a video input/output port, an earphone port, etc.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The display 160 may, for example, show a visual output to a user. The visual output may be shown in the form of a text, a graphic, a video, and a combination of them. The display 160 may display (output) a variety of information processed in the electronic device 101. For example, the display 160 may display a user interface (UI) or graphical UI (GUI) related with the use of the electronic device 101. In accordance with various embodiments, the display 160 may display various user interfaces (e.g., UI or GUI) related with an operation (e.g., a content display operation, a state information display operation, etc.) performed by the electronic device 101.

In various exemplary embodiments, the display 160 can include a flat type display, or a curved display (or bended display) capable of being curved or bent or rolled without damage through a thin and flexible substrate like paper. The curved display may be combined to a housing (e.g., a bezel or a main body), to maintain a curved form. In various embodiments, the electronic device 101 may be implemented as a display device that a user can be free to bend and unbend like a flexible display, inclusive of a form such as the curved display as well.

In various embodiments, the display 160 may provide the flexibility of being foldable and unfoldable, by replacing, with a plastic film, a glass substrate encompassing a liquid crystal in a liquid crystal display (LCD), a light emitting diode (LED), an organic light emitting diode (OLED), or an active OLED (AMOLED), etc. In various embodiments, the display 160 may be extended up to at least one side (e.g., a surface of at least one of the left, the right, the top and the bottom) of the electronic device 101, and be folded equal to or less than a radius of curvature (e.g., a radio of curvature of 5 cm, 1 cm, 7.5 mm, 5 mm, 4 mm, etc.) in which the curved display is operable, and be combined to a side of a housing. An embodiment is not limited to this, and the display 160 of various embodiments may be implemented in a rectangular form not having a radius of curvature as well.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like.

According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN).

According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS".

The wired communication may, for example, include at least one of a universal serial bus (USB), a high definition multimedia interface (HDMI), a recommended standard-232 (RS-232), power line communication (PLC), a plain old telephone service (POTS), and the like.

The network 162 may include at least one of a telecommunications network, for example, a computer network (e.g., local area network (LAN) or wide area network (WAN)), the Internet or a telephone network.

The external electronic device 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106).

According to an embodiment, where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

The server 106 may include, for example, at least one of an integration server, a provider server (or a service provider server), a content server, an Internet server, a cloud server, a web server, a secure server, or a certification server, etc.

Figure 2:
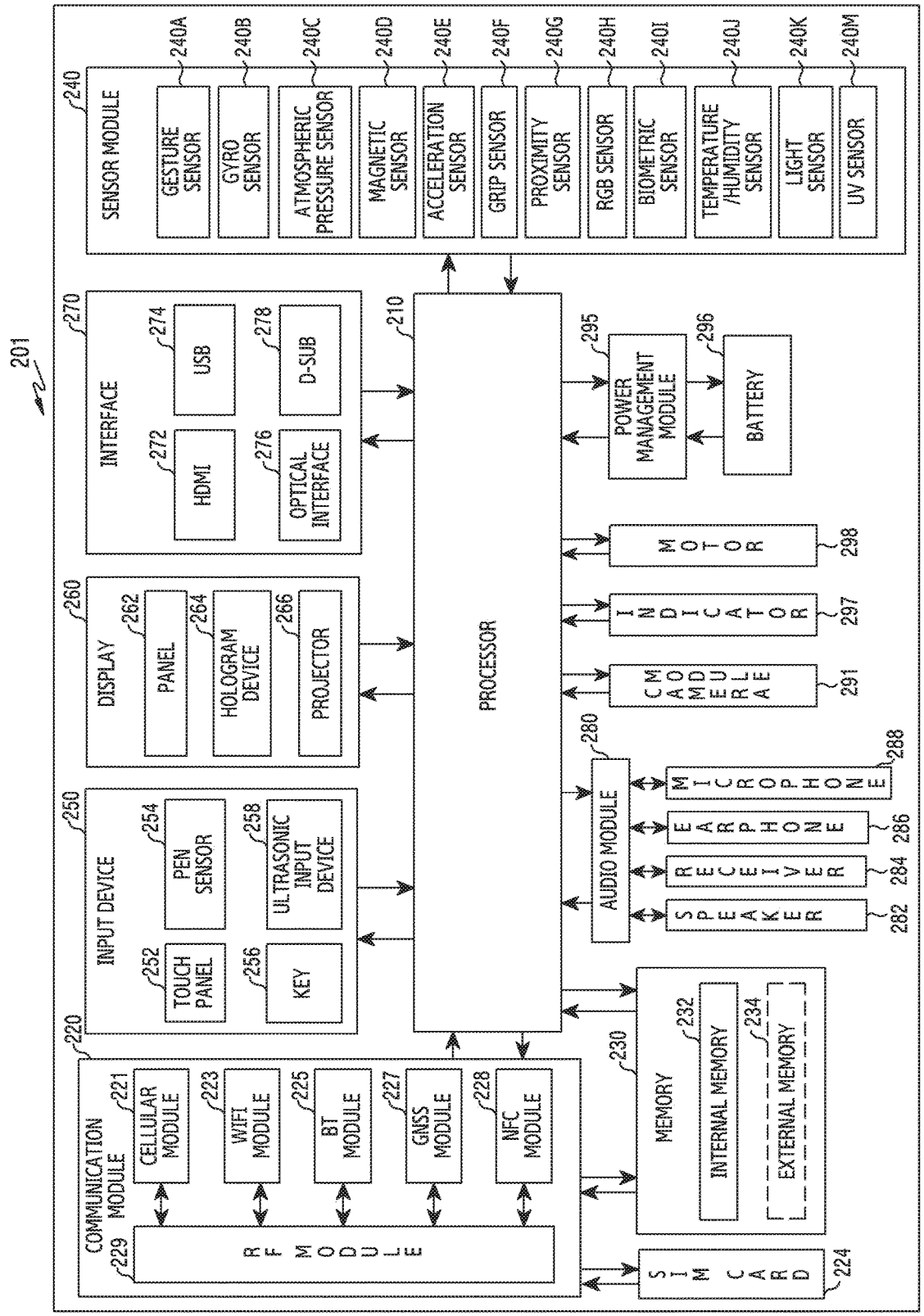
FIG. 2 is a block diagram of an electronic device according to various embodiments of the present disclosure.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

In various embodiments, the constructions illustrated in FIG. 2 are not essential, so the electronic device 201 may be implemented to have constructions more than the constructions illustrated in FIG. 2, or have constructions less than them. For example, the electronic device 201 of various embodiments may not include any partial constituent element according to its kind. In accordance with various embodiments, the constructions of the aforementioned electronic device 201 may be safely mounted on a housing (or a bezel or main body) of the electronic device 201, or be formed outside it.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP).

The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

In various embodiments, the processor 210 may include one or more processors. For example, the processor 210 may include a communication processor (CP), an application processor (AP), an interface (e.g., general purpose input/output (GPIO)), or an internal memory, etc., as separate constituent elements, or may integrate the same into one or more integrated circuits. In accordance with an embodiment, the application processor may execute several software programs, to perform several functions of the electronic device 201. The communication processor may perform processing and control for voice communication and data communication. The processor 210 may take charge of a role of executing a specific software module (e.g., an instruction set) stored in the memory 230, to perform specific several functions corresponding to the specific software module.

In various embodiments, the processor 210 may control a general operation of the electronic device 201. In various embodiments, the processor 210 may control an operation of a hardware module such as the audio module 280, the interface 270, the display 260, the camera module 291, the communication module 220, the power management module 295, the sensor module 240, or the motor 298, etc. In accordance with various embodiments, the processor 210 may be electrically coupled with the display 260 of the electronic device 201, the memory 230, the communication module 220, the interface 270, and/or the camera module 291.

In accordance with various embodiments, the processor 210 may process an operation related with obtaining a face area from an image, and dividing an attribute (e.g., human race information) of the face area, and performing white balance correction on the basis of the attribute. According to various embodiments, the processor 210 may process an operation related with acquiring an image including one or more objects, and identifying a first area corresponding to a face among the one or more objects in the image, and identifying a second area corresponding to the background among the one or more objects. According to various embodiments, the processor 210 may process an operation related with confirming a ratio (or a difference value) between color information of the first area and color information of the second area, and correcting white balance corresponding to the first area on the basis of a first level in response to the ratio satisfying a set first condition, and correcting the white balance corresponding to the first area on the basis of a second level in response to the ratio satisfying a second condition. According to various embodiments, the processor 210 may process an operation related with displaying, through the display 260, an image of which the white balance corresponding to the first area has been corrected on the basis of a corresponding one level among the first level and the second level.

The processing (or control) operation of the processor 210 of various embodiments is described in detail with reference to the drawings described later.

The communication module 220 may, for example, have the same or similar construction with the communication interface 170. The communication module 220 may, for example, include a cellular module 221, a WiFi module 223, a Bluetooth module 225, a GNSS module 227, a near field communication (NFC) module 228, and a radio frequency (RF) module 229. Although not illustrated, the communication module 220 may, for example, further include a WiGig module (not shown) as well. In accordance with an embodiment, the WiFi module 223 and the WiGig module (not shown) may be implemented in the form of one chip as well.

The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package.

The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module.

The WiFi module 223 may refer to a module for forming, for example, wireless Internet access and a wireless local area network (LAN) link with an external device (e.g., the another electronic device 102 or the server 106, etc.). The WiFi module 223 may be built in or built outside the electronic device 201. A wireless Internet technology may use WiFi, WiGig, Wibro, world interoperability for microwave access (WiMax), high speed downlink packet access (HSDPA), millimeter Wave (mmWave), etc. The WiFi module 223 may be directly coupled with the electronic device 201, or be interlocked with an external device (e.g., another electronic device 104, etc.) coupled through a network (e.g., a wireless Internet network) (e.g., the network 162), to transmit various data of the electronic device 201 to the external, or receive from the external. The WiFi module 223 may maintain a full-time ON state, or turn-On/turn-Off in accordance with setting of the electronic device or a user input.

The Bluetooth module 225 and the NFC module 228 may, for example, refer to a short range communication module for performing short range communication. The short range communication technology may be Bluetooth, Bluetooth low energy (BLE), radio frequency identification (RFID), IrDA, ultra wideband (UWB), Zigbee, or NFC, etc. The short range communication module may be interlocked with an external device (e.g., another electronic device 102, etc.) coupled with the electronic device 201 through a network (e.g., a short range communication network), to transmit various data of the electronic device 201 to the external device or receive. The short range communication module (e.g., the Bluetooth module 225 and the NFC module 228) may maintain a full-time ON state, or turn-on/turn-off in accordance with setting of the electronic device 201 or a user input.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

In various embodiments, the memory 230 may store one or more programs, data or instructions related with enabling the processor 210 to obtain a face area from an image, and divide an attribute (e.g., human race information) of the face area, and perform white balance correction on the basis of the attribute. In accordance with various embodiments, the memory 230 may store various setting information (e.g., color information, a reference value, a correction value, a white balance offset, a backlight ratio, etc.) for white balance correction on an attribute (e.g., a human race) of an object of a face area. In accordance with various embodiments, the memory 230 may store various state based setting information related with controlling, by the processor 210, the white balance correction on the attribute (e.g., a human race) of the object of the face area, in the form of a look-up table (or mapping table).

The memory 230 may include an extended memory (e.g., an external memory 234) or an internal memory (e.g., an embedded memory 232). The electronic device 201 may operate in relation to a web storage that performs a storage function of the memory 230 on the Internet as well.

The memory 230 may store one or more software (or software modules). For example, a software constituent element may include an operating system (OS) software module, a communication software module, a graphic software module, a user interface software module, a moving picture experts group (MPEG) module, a camera software module, one or more application software modules and the like. Also, a module, which is a software constituent element, may be expressed as a set of instructions and thus, the module is expressed as an instruction set as well. The module is also expressed as a program as well. In various embodiments of the present disclosure, the memory 230 may include an additional module (instructions) other than the above-mentioned module. Or, some modules (instructions) may not be used according to need.

The operating system software module may include several software constituent elements for controlling a general system operation. The control of this general system operation may mean, for example, memory management and control, storage hardware (device) control and management, or power control and management, etc. Also, the operating system software module may perform even a function of making smooth a communication between several hardware (devices) and software constituent elements (modules).

The communication software module may enable communication with another electronic device such as a wearable device, a smart phone, a computer, a server, or a portable terminal, etc., through the communication module 220 or the interface 270. And, the communication software module may be constructed to have a protocol structure corresponding to a corresponding communication scheme.

The graphic software module may include several software constituent elements for providing and displaying a graphic on the display 260. In various embodiments, the term of graphics may be used as a meaning including a text, a web page, an icon, a digital image, a video, an animation, etc.

The user interface software module may include several software constituent elements related with a user interface (UI). For example, the user interface software module may include content on how a state of the user interface is altered, or in which condition the alteration of the state of the user interface is accomplished, or the like.

The MPEG module may include a software constituent element for enabling digital content (e.g., a video and an audio) related processes and functions (e.g., content provision, reproduction, distribution, transmission and the like).

The camera software module may include a camera related software constituent element of enabling camera related processes and functions.

The application module may include a web browser including a rendering engine, an email, an instant message, word processing, keyboard emulation, an address book, a touch list, a widget, digital right management (DRM), iris scan, context cognition, voice recognition, a position determining function, a location based service, etc.

In accordance with various embodiments, the application module may include a health care (e.g., measuring a quantity of motion or a blood sugar, etc.), or an environment information (e.g., pressure, humidity, or temperature information) providing application, etc. According to various embodiments, the application module may include one or more applications for obtaining a face area from an image, and dividing an attribute (e.g., human race information) of the face area, and performing white balance correction on the basis of the attribute.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a biometric (medical) sensor 240I, a temperature/humidity sensor 240J, an ambient light (illuminance) sensor 240K or an ultra violet (UV) sensor 240M.

Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258.

The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user.

The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave. In accordance with various embodiments, the input device 250 may include an electronic pen. In accordance with various embodiments, the input device 250 may be implemented to be able to receive a force touch.

The display 260 (e.g., the display 160) may include a panel 262, a hologram device 264, a projector 266, a display driver interface (DDI) 268, and/or a control circuit for controlling them.

The panel 262 may, for example, be implemented to be flexible, transparent, or wearable. The panel 262 may be constructed as one or more modules together with the touch panel 252. According to one embodiment, the panel 262 may include a pressure sensor (or force sensor) to measure the strength of pressure from a user's touch. The pressure sensor may be formed with the touch panel 252 in a single body, or may be provided as one or more sensors separate from the touch panel 252.

The panel 262 may be safely mounted in the display 260, and may obtain a user input which touches or approaches a surface of the display 260. The user input may include a touch input or proximity input that is inputted based on at least one of a single-touch, a multi-touch, hovering, or an air gesture. In various embodiments, the panel 262 may receive a user input for initiating an operation related with the use of the electronic device 201, and may provide an input signal of the user input.

The panel 262 may be configured to convert a change of a pressure applied to a specific portion of the display 260 or capacitance provided in the specific portion of the display 260, etc., into an electrical input signal. The panel 262 may obtain a location and area in which an input tool (e.g., a user finger, an electronic pen, etc.) touches or approaches a surface of the display 260. Also, the panel 262 may be implemented to obtain even a pressure (e.g., a force touch) at touch in accordance with a touch scheme applied.

The hologram device 264 may show a three-dimensional image to the air using an interference of light. The projector 266 may project light onto a screen, to display an image. The screen may, for example, be located inside or outside the electronic device 201.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The interface 270 may receive data from another electronic device, or receive a power source, to forward to the respective elements of the electronic device 201. The interface 270 may enable to transmit data of the electronic device 201 to another electronic device. For example, the interface 270 may include a wired/wireless headphone port, an external electric charger port, a wired/wireless data port, a memory card port, an audio input/output port, a video input/output port, an earphone port, etc. In accordance with various embodiments, the interface 270 (e.g., the USB 274) may perform a role of an interface with all external devices coupled to the electronic device 201. In various embodiments, the interface 270 (e.g., the USB 274) may include a USB type C interface (below, a type-C interface).

The audio module 280 may, for example, convert a sound and an electrical signal interactively. At least some constituent elements of the audio module 280 may be, for example, included in the input output interface 150 illustrated in FIG. 1.

The audio module 280 may for example, process sound information that is inputted or outputted through a speaker 282, a receiver 284, an earphone 286, the microphone 288 or the like. The camera module 291 is, for example, a device able to photograph a still image and a video. The audio module 280 may perform a function of transmitting an audio signal received from the processor 210, to the output device (e.g., the speaker 282, the receiver 284 or the earphone 286), and forwarding an audio signal such as a voice, etc. received from the input device (e.g., the microphone 288), to the processor 210. The audio module 280 may convert voice/sound data into an audible sound through the output device under the control of the processor 210 and output, and may convert an audio signal such as a voice, etc. received from the input device, into a digital signal, and forward to the processor 210.

The speaker 282 or the receiver 284 may output audio data that is received from the communication module 220 or is stored in the memory 230. The speaker 282 or the receiver 284 may output a sound signal related with various operations (functions) carried out in the electronic device 201 as well. The microphone 288 may receive and process an external sound signal into electrical voice data. Various noise reduction algorithms for removing a noise provided in a process of receiving an external sound signal may be implemented in the microphone 288. The microphone 288 may take charge of the input of audio streaming such as a voice command, etc.

According to an embodiment, the camera module 291 may include one or more image sensors (e.g., front sensor or rear sensor), a lens, an image signal processor (ISP) or a flash (e.g., an LED, a xenon lamp or the like).

In accordance with various embodiments, the camera module 291 refers to a construction of supporting a capturing function of the electronic device 201. In accordance with the control of the processor 210, the camera module 291 may capture an arbitrary subject, and forward captured data (e.g., image) to the display 260 and the processor 210.

In accordance with various embodiments, the camera module 291 may, for example, include a first camera (e.g., a color (RGB) camera) for acquiring color information and a second camera (e.g., an infrared (IR) camera) for acquiring depth information (e.g., location information and distance information of a subject). In accordance with an embodiment, the first camera may be a front camera installed in front of the electronic device 201. In accordance with various embodiments, the front camera may be replaced with the second camera, and the first camera may not be provided in front of the electronic device 201. In accordance with various embodiments, the first camera may be disposed in front of the electronic device 201 along with the second camera, together. In accordance with an embodiment, the first camera may be a rear camera installed in rear of the electronic device 201. In accordance with an embodiment, the first camera may be of a form including all the front camera and the rear camera provided in front and rear of the electronic device, respectively.

The camera module 291 may include an image sensor. The image sensor may be implemented as a charged coupled device (CCD) or a complementary metal-oxide semiconductor (CMOS).

The power management module 295 may, for example, manage the electric power of the electronic device 201. According to an embodiment, the power management module 295 may include a power management integrated circuit (PMIC), a charger IC or a battery or fuel gauge.

The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201.

The motor 298 may convert an electrical signal into a mechanical vibration, and may generate a vibration, a haptic effect or the like. In accordance with various embodiments, the electronic device 201 may include a motor driving control unit (not shown), and the motor 298 may be driven according to the control of the motor driving control unit. According to an embodiment, the processor 210 may apply a signal related with vibration provision to the motor driving control unit, and the motor driving control unit may output, to the motor 298, a motor driving signal corresponding to a signal received from the processor 210. The motor 298 may be driven by a motor driving signal received from the motor driving control unit, to provide a vibration.

In various embodiments, the motor 298 may be implemented by a vibration providing device (or module) providing a vibration. The vibration providing device may include, for example, a vibrator, an actuator, or a haptic providing device in addition to the motor 298. In various embodiments, one or more vibration providing devices may be used to perform an operation related with vibration provision as well.

The electronic device 201 may, for example, include a mobile TV support device (e.g., GPU) capable of processing media data according to the standards of digital multimedia broadcasting (DMB), digital video broadcasting (DVB), mediaFlo™ or the like.

Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
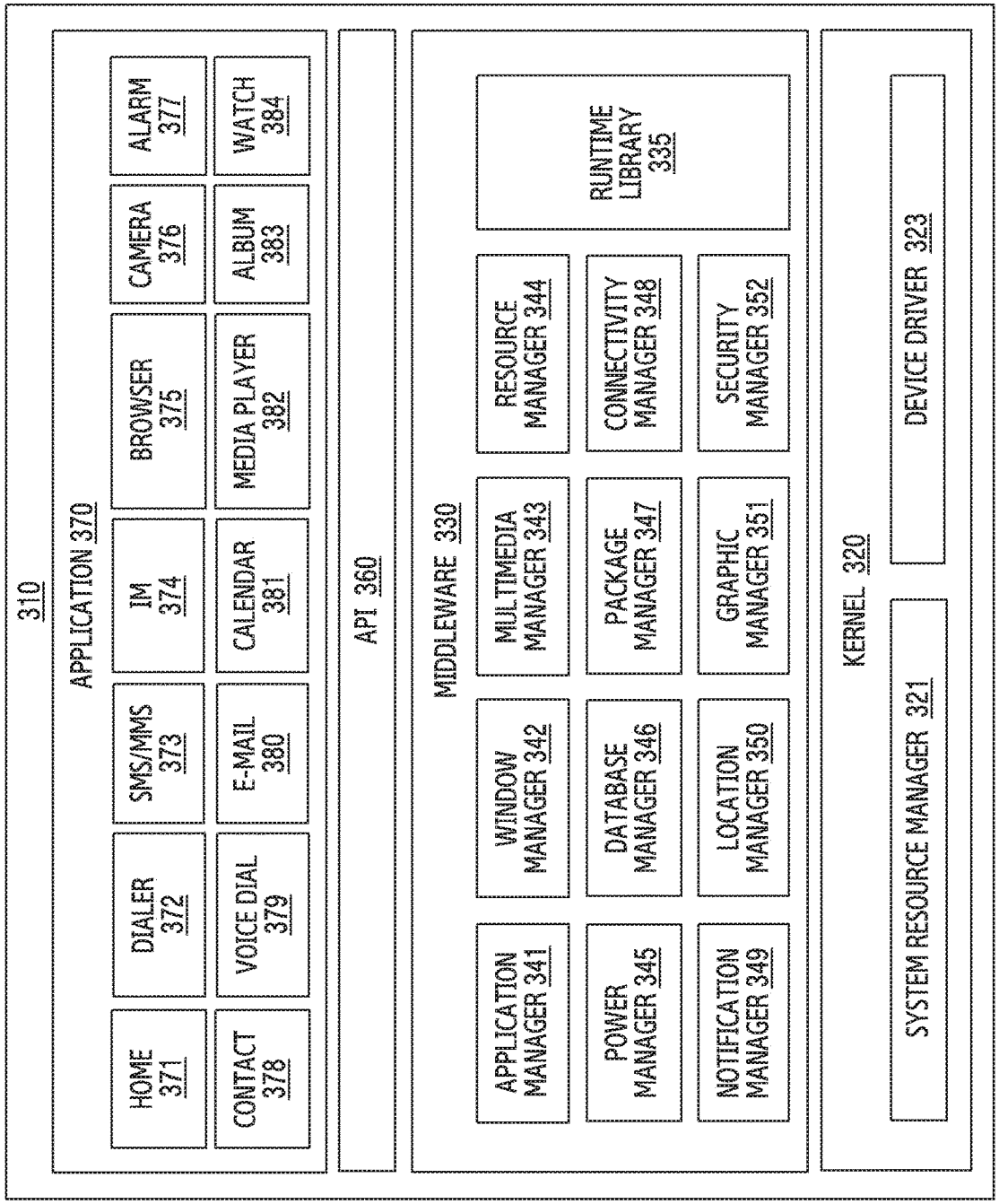
FIG. 3 is a block diagram of a program module according to various embodiments of the disclosure.

FIG. 3 illustrates a block diagram of a program module according to various embodiments.

According to an embodiment, the program module 310 (e.g., the program 140) may include an operating system (OS) controlling resources related to an electronic device (e.g., the electronic device 101) and/or various applications (e.g., the application program 147) run on the operating system. The operating system may, for example, include Android™, iOS™, Windows™, Symbian™, Tizen™, or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloadable from an external electronic device (e.g., the electronic device 102 or 104, the server 106, etc.).

The kernel 320 may, for example, include a system resource manager 321 and/or a device driver 323.

The system resource manager 321 may perform control of a system resource, allocation thereof, or recovery thereof. According to an embodiment, the system resource manager 321 may include a process management unit, a memory management unit, or a file system management unit.

The device driver 323 may, for example, include a display driver, a camera driver, a Bluetooth driver, a shared memory driver, a USB driver, a keypad driver, a WiFi driver, an audio driver, or an inter-process communication (IPC) driver.

The middleware 330 may, for example, provide a function that the application 370 needs in common, or provide various functions to the application 370 through the API 360 wherein the application 370 may make use of restricted system resources within an electronic device.

According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a fan control manager 353.

The runtime library 335 may, for example, include a library module that a compiler utilizes so as to add a new function through a programming language while the application 370 is executed. The runtime library 335 may perform input output management, memory management, or arithmetic function processing.

The application manager 341 may, for example, manage a lifecycle of the application 370. The window manager 342 may manage a GUI resource which is used for a screen.

The multimedia manager 343 may obtain a format used for playing media files, and perform encoding or decoding of the media file by using a codec suitable to the corresponding format. The resource manager 344 may manage a source code of the application 370 or a space of a memory.

The power manager 345 may, for example, manage a battery capacity, temperature or power supply, and identify or provide power information used for an operation of an electronic device by using corresponding information among this. According to an embodiment, the power manager 345 may interwork with a basic input/output system (BIOS).

The database manager 346 may, for example, provide, search or change a database that will be used in the application 370. The package manager 347 may manage the installing or refining of an application that is distributed in the form of a package file. The connectivity manager 348 may, for example, manage wireless connectivity. The notification manager 349 may, for example, provide an event such as an arrival message, an appointment, a proximity notification, etc. to a user.

The location manager 350 may, for example, manage location information of an electronic device. The graphic manager 351 may, for example, manage a graphic effect that will be provided to the user, or a user interface related with this. The security manager 352 may, for example, provide system security or user authentication.

According to an embodiment, the middleware 330 may include a telephony manager for managing a voice or video call function of the electronic device, or a middleware module capable of forming a combination of functions of the aforementioned constituent elements. According to an embodiment, the middleware 330 may provide a module that is specialized by type of an operating system. The middleware 330 may dynamically delete some of the existing constituent elements, or add new constituent elements.

The API 360 is, for example, a set of API programming functions, and may be provided to have another construction according to the operating system. For example, Android or iOS may provide one API set by platform, and Tizen may provide two or more API sets by platform.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to various embodiments, the application 370 may include an application for obtaining a face area from an image, and dividing an attribute (e.g., human race information) of the face area, and performing a white balance correction operation on the basis of the attribute.

According to an embodiment, the application 370 may include an information exchange application capable of supporting information exchange between an electronic device and an external electronic device. The information exchange application may, for example, include a notification relay application for relaying specific information to the external electronic device, or a device management application for managing the external electronic device.

For example, the notification relay application may relay notification information provided in another application of the electronic device, to the external electronic device, or receive notification information from the external electronic device and provide the received notification information to a user. The device management application may, for example, install, delete, or refine a function (e.g., turned-on/turned-off of the external electronic device itself (or some components) or adjustment of a brightness (or resolution) of a display) of the external electronic device which communicates with the electronic device, or an application which operates in the external electronic device.

According to an embodiment, the application 370 may include an application (e.g., a health care application of a mobile medical instrument) designated according to properties of the external electronic device.

According to an embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

The term "module" used in the document may include a unit consisting of hardware, software or firmware, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an application-specific integrated circuit (ASIC) chip, a field-programmable gate array (FPGA) or a programmable logic device, which has been known or will be developed in future, performing some operations.

At least a part of an apparatus (e.g., modules or functions thereof) or method (e.g., operations) according to various embodiments may, for example, be implemented as an instruction which is stored in a computer-readable storage medium (e.g., the memory 130) in the form of a program module. In response to the instruction being executed by a processor (e.g., the processor 120 of FIG. 1 or the processor 210 of FIG. 2), the processor may perform a function corresponding to the instruction.

The computer-readable recording medium may include a hard disk, a floppy disk, a magnetic medium (e.g., a magnetic tape), an optical recording medium (e.g., a compact disk-read only memory (CD-ROM), a digital versatile disk (DVD)), a magneto-optical medium (e.g., a floptical disk), an internal memory, etc. The instruction may include a code which is made by a compiler or a code which is executable by an interpreter. The module or program module according to various embodiments may include at least one or more of the aforementioned constituent elements, or omit some of them, or further include another constituent element.

According to various embodiments, a recording medium may include a computer-readable recording medium recording a program for executing various methods described later in the processors 120 and 210.

Operations carried out by the module, the program module or the another constituent element according to various embodiments may be executed in a sequential, parallel, repeated or heuristic manner, or at least some operations may be executed in different order or may be omitted, or another operation may be added.

Figure 4:
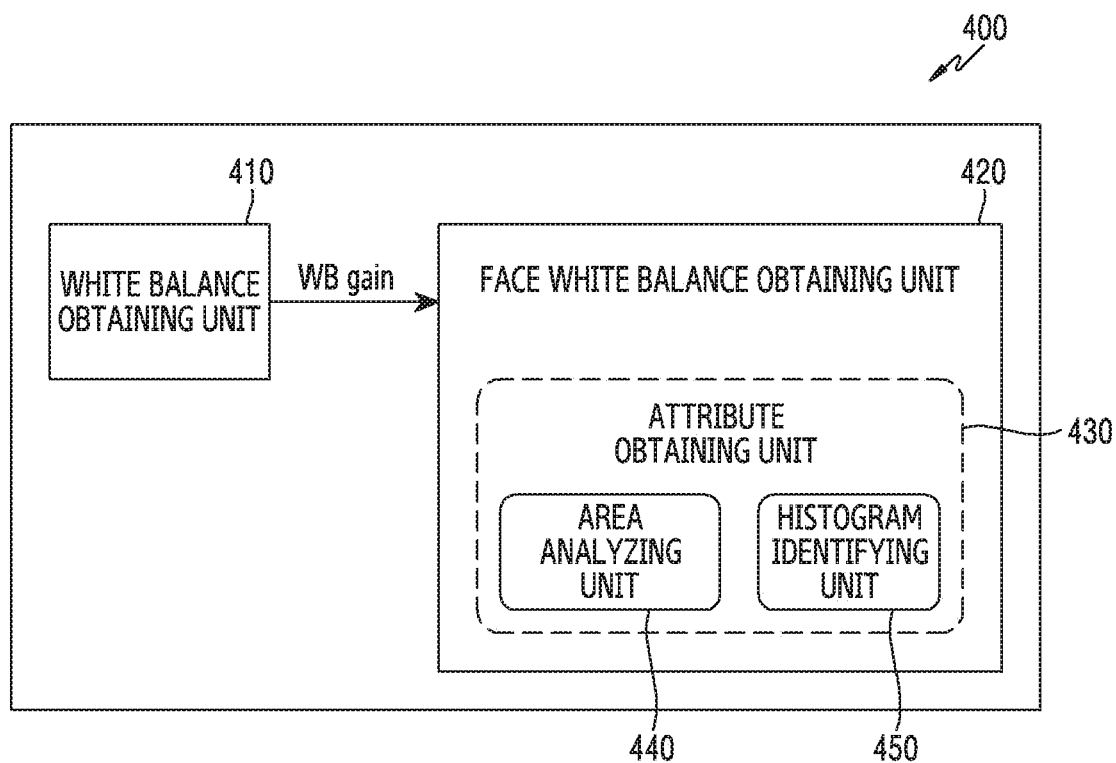
FIG. 4 is a diagram illustrating an example of a white balance correction module in an electronic device according to various embodiments of the present disclosure.
Figure 5:
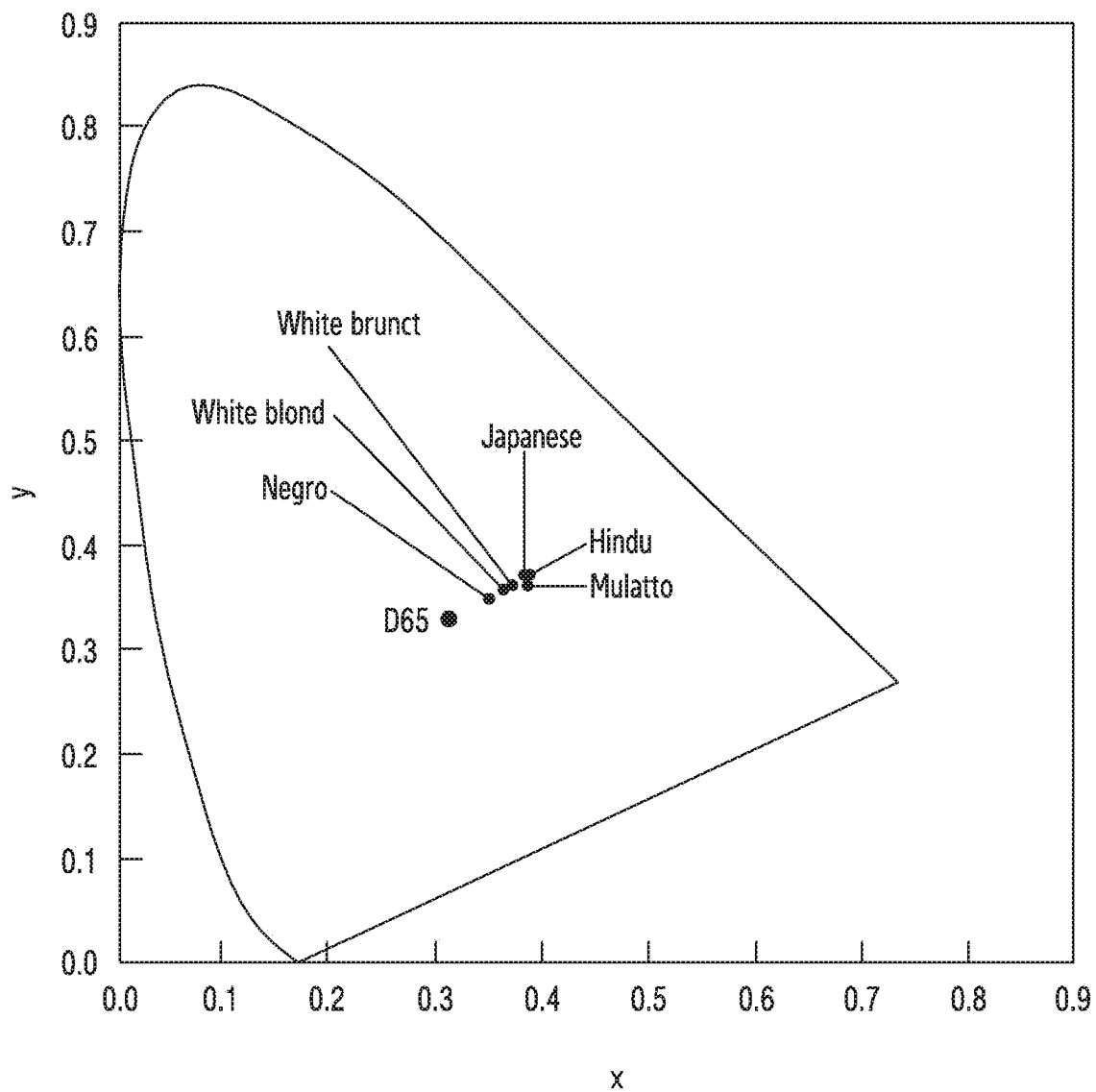
FIG. 5 and FIG. 6 are diagrams illustrating to explain a difference of color between attributes of objects in an electronic device according to various embodiments of the present disclosure.
Figure 6:
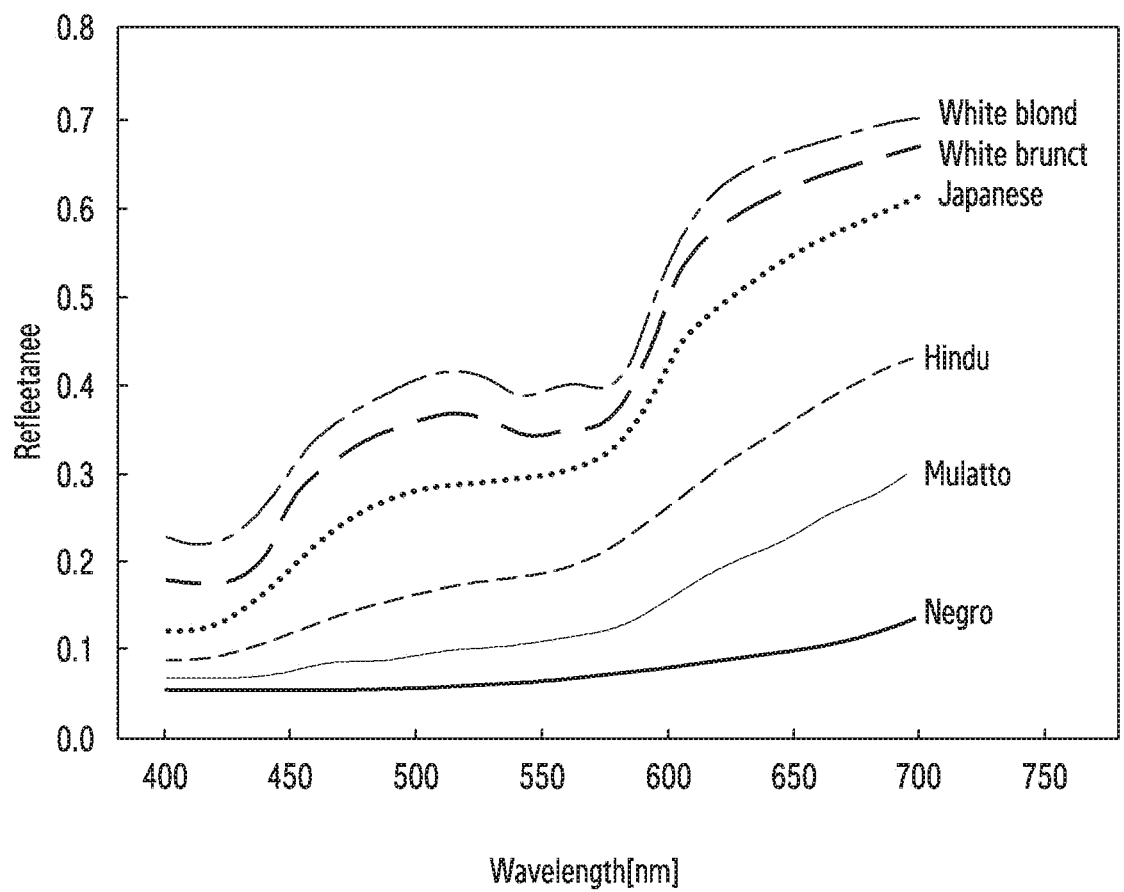

FIG. 4 is a diagram illustrating an example of a white balance correction module in an electronic device according to various embodiments of the present disclosure. FIG. 5 and FIG. 6 are diagrams illustrating to explain a difference of color between attributes of objects in the electronic device according to various embodiments of the present disclosure.

As illustrated in FIG. 4, FIG. 4 may represent an example of a white balance correction module 400 related with controlling white balance by dividing an attribute (e.g., a human race) of a face area of an image in an electronic device (e.g., the electronic devices 101 or 201 of FIG. 1 or FIG. 2) according to various embodiments.

In various embodiments, the white balance correction module 400 may be included in a processor (e.g., the processors 120 or 210 of FIG. 1 or FIG. 2 and below, the processor 210) as a hardware module, or be included as a software module. In various embodiments, the electronic device may include an image signal processor in the processor 210, or include the image signal processor separately from the processor 210, or the white balance correction module 400 may be included in the image signal processor as a hardware module or software module as well. In various embodiments, the white balance correction module 400 may be a module configured to perform auto white balance (AWB) correction.

Referring to FIG. 4, the white balance correction module 400 for providing a white balance function of various embodiments may include a white balance obtaining unit 410, a face white balance obtaining unit 420, etc. In various embodiments, the face white balance obtaining unit 420 may include an attribute obtaining unit 430 which includes an area analyzing unit 440, a histogram identifying unit 450, etc.

The white balance obtaining unit 410 may operate general auto white balance. For example, the auto white balance function may represent a function of correcting a color difference provided from a difference of a color temperature. According to an embodiment, at image capturing, there may be a difference of expression of color according to light (or a light source). For example, when a color temperature is low, it takes red light, and when the color temperature is high, it takes blue light, so the white balance obtaining unit 410 may correct a color temperature of light, to enable to capture ideal white.

In accordance with various embodiments, the white balance obtaining unit 410 may obtain a white balance (WB) gain for recreating white by obtaining a gray area under a light source and making identical a red, green, blue (RGB) ratio of the gray area (e.g., R=G=B). According to an embodiment, the white balance obtaining unit 410 may obtain the white balance gain according to the gray area regardless of the existence or non-existence of a face in an image. In accordance with various embodiments, the white balance obtaining unit 410 may obtain a white balance gain corresponding to the background in the image, and provide the white balance gain to the face white balance obtaining unit 420. In various embodiments, the white balance obtaining unit 410 may be named a first correction module or a first gain providing unit, etc.

The face white balance obtaining unit 420 may operate auto white balance related to a face area in an image. For example, it may be assumed that in response to an image including a face of a person, the face is under a high color temperature light source, and the background is under a lower color temperature light source. In this case, in response to a white balance of a face area being adjusted suitable to the background, a face color is expressed in blue compared with the reality and thus may be, for example, expressed as an unlively face.

In various embodiments, although not illustrated, the electronic device may include a face obtaining unit (not shown) capable of, at image capturing, providing a face (or a face area) in the captured image, and may provide, to the face white balance obtaining unit 420, face associated information related with a face count, a face position, etc. on the basis of the face obtaining unit.

According to various embodiments, the face white balance obtaining unit 420 may obtain a white balance gain for a face area, on the basis of the face associated information acquired (received) from the face obtaining unit. In accordance with various embodiments, the face white balance obtaining unit 420 may obtain an attribute of the face area in an image, and obtain a white balance gain on the basis of the obtained attribute. In various embodiments, the attribute of the face area (or face) may represent an index related with a human race or skin color on the basis of the face. According to an embodiment, the human race may be mainly divided into three of the white race, the colored race, and the yellow race, and a reflectance by wavelength of the skin color may be different on a per-human-race basis.

For example, referring to FIG. 5 and FIG. 6, FIG. 5 may represent an example of a Commission Internationale de l'Eclairage (CIE) color system of a skin color dependent on a human race of an object of a face area, and FIG. 6 may represent an example of a reflectance by wavelength of the skin color dependent on the human race. In FIG. 5, an x axis and a y axis may represent a quantity of brightness of color, respectively, and x and y may represent chromaticity as one group. As illustrated in FIG. 5, as seen from a CIExy coordinate of the skin color dependent on the human race, it may be identified that the colored race is shifted toward blue compared with the yellow race (or the white race). Also, as seen from a graph of a reflectance by wavelength of the skin color dependent on the human race of FIG. 6, it may be identified that the colored race is bluish compared to the yellow race (or the white race) because the colored race has a low reflectance of a long wavelength band compared to the yellow race (or the white race). According to an embodiment, the colored race may be bluish because the colored race has the low reflectance of the long wavelength band of the skin color compared to the yellow race or the white race. Accordingly, according to various embodiments, when applying a face based auto white balance (AWB), the face white balance obtaining unit 420 may differently apply white balance by human race division by considering the human race, wherein the skin of the colored race is prevented from getting yellowish compared to the reality, or inversely the yellow race (or the white race) is prevented from getting bluish.

According to various embodiments, the face white balance obtaining unit 420 may distinguish an attribute (e.g., a human race) of a face area in a face based auto white balance and improve the expression of a natural color (e.g., the natural skin color of the human race) dependent on the attribute. For this, in various embodiments, the face white balance obtaining unit 420 may include the attribute obtaining unit 430.

The attribute obtaining unit 430 may obtain an attribute of a face area in a face based white balance, and obtain a face white balance gain on the basis of the obtained attribute. The attribute distinction unit 430 may include the area analyzing unit 440 for analyzing the attribute on the basis of the face area, and the histogram identifying unit 450 for obtaining a backlight (e.g., a background area is bright and the face area is dark) ratio on the basis of a histogram.

The area analyzing unit 440 may distinguish an attribute by using a color information (e.g., brightness information, an RGB, a color temperature, etc.) ratio between a background area and a face area in an image. According to an embodiment, the electronic device may obtain a ratio of first data (e.g., color information (RGB stat, $_{background}$) corresponding to the entire image) of the entire image excepting the face area in the image and second data (e.g., color information (RGB stat, $_{face}$) corresponding to the face area) of the face area in the image. Regarding this, a description is made in detail with reference to the drawings described later.

The histogram identifying unit 450 may reflect a backlight ratio on a reference value for attribute division. For example, the histogram identifying unit 450 may set a threshold reduce weight for altering the reference value according to the backlight ratio. In various embodiments, the backlight ratio may be obtained using a histogram. The histogram may represent the distribution of pixels from a dark portion of an image to a bright portion. According to an embodiment, a brightness range of the image may include 0 to 255, and may represent a state in which the image is dark as it goes to 0, and the image is bright as it goes to 255.

The histogram identifying unit 450 may reflect a backlight ratio that uses histogram data on a reference value (e.g., a first reference value for first attribute distinction and a second reference value for second attribute distinction), to set a third reference value (e.g., the final reference value) for attribute division. Regarding this, a description is made in detail with reference to the drawings described later.

As taking a look above, an electronic device of various embodiments may include a display (e.g., the display 160 or 260 FIG. 1 or FIG. 2), and a processor (e.g., the processor 120 or 210 of FIG. 1 or FIG. 2) functionally coupled with the display, and the processor may be configured to acquire an image including one or more objects, identify a first area corresponding to a face among the one or more objects in the image, identify a second area corresponding to the background among the one or more objects, confirm a ratio between color information of the first area and color information of the second area, correct, on the basis of a first level, white balance corresponding to the first area in response to the ratio satisfying a set first condition, correct, on the basis of a second level, the white balance corresponding to the first area in response to the ratio satisfying a set second condition, and display, through the display, the image of which the white balance corresponding to the first area has been corrected on the basis of corresponding one level among the first level and the second level.

In accordance with various embodiments, the processor may be configured to identify a backlight ratio in the image, and correct the white balance corresponding to the first area, by more using the backlight ratio.

In accordance with various embodiments, the processor may be configured to identify the backlight ratio on the basis of histogram data obtained from the image.

In accordance with various embodiments, the processor may be configured to obtain auto white balance (AWB) of the first area, as a part of the correcting operation, and multiply the auto white balance by a first correction value corresponding to the first specified condition, to correct on the basis of the first level, or multiply by a second correction value corresponding to the second specified condition, to correct on the basis of the second level.

As taking a look above, an electronic device of various embodiments may include a camera module 291, a display (e.g., the display 160 or 260 of FIG. 1 or FIG. 2), and a processor (e.g., the processor 120 or 210 of FIG. 1 or FIG. 2) functionally coupled with the camera module and the display, and the processor may be configured to acquire an image including a face object, divide a background area and a face area in the image, identify an attribute of the face area, obtain a weight for correcting white balance on the basis of the attribute of the face area, correct the white balance on the basis of the weight, and display, through the display, the image on the basis of the corrected white balance.

In accordance with various embodiments, the attribute of the face area may include an index related to a human race or skin color corresponding to an object of the face area in the image.

In accordance with various embodiments, the processor may be configured to identify the attribute on the basis of a color information ratio of the face area.

In accordance with various embodiments, the processor may be configured to, in response to the color information ratio of the face area being equal to or being less than a set first reference value, identify the object of the face area as a first attribute, and in response to the color information ratio of the face area being equal to or being greater than a set second reference value, identify the object of the face area as a second attribute, and identify the weight on the basis of the first attribute or the second attribute.

In accordance with various embodiments, the processor may be configured to identify third white balance on the basis of a first white balance gain associated with the background area, a second white balance gain associated with the face area, and a weight of the attribute, and provide the image on the basis of the identified third white balance.

In accordance with various embodiments, the processor may be configured to obtain color information ratio of the face area, compare the color information ratio and at least one reference value set for attribute distinction, and, on the basis of the comparison result, identify whether the color information ratio is included in the first reference value or less, or is included in the second reference value or more, or is included between the first reference value and the second reference value.

In accordance with various embodiments, the processor may be configured to, in response to the color information ratio corresponding to between the first reference value and the second reference value, identify the object of the face area as a third attribute.

In accordance with various embodiments, the processor may be configured to obtain the color information ratio, based further on color information corresponding to the background area.

In accordance with various embodiments, the processor may be configured to alter a reference value of brightness information for attribute division according to a backlight ratio in the image, and identify the attribute on the basis of the altered reference value.

In accordance with various embodiments, the processor may be configured to obtain a reduce weight for altering the reference value according to the backlight ratio, obtain another reference value by using the reduce weight, and identify an attribute of the face area on the basis of the color information ratio of the face area the another reference value.

In accordance with various embodiments, the processor may be configured to, in response to the image including a plurality of face areas, compare color information ratios of the plurality of face areas and a reference value, identify a first attribute and a second attribute corresponding to the plurality of face areas, on the basis of the comparing result, obtain a count ratio of face areas corresponding to the identified first attribute and face areas corresponding to the identified second attribute among the plurality of face areas, and obtain a weight for white balance correction on the basis of the count ratio of the first attribute and the second attribute.

In accordance with various embodiments, the processor may be configured to identify the weight on the basis of any one attribute of which the count ratio is high, or differentially identify the weight according to the extent of the count ratio.

Figure 7:
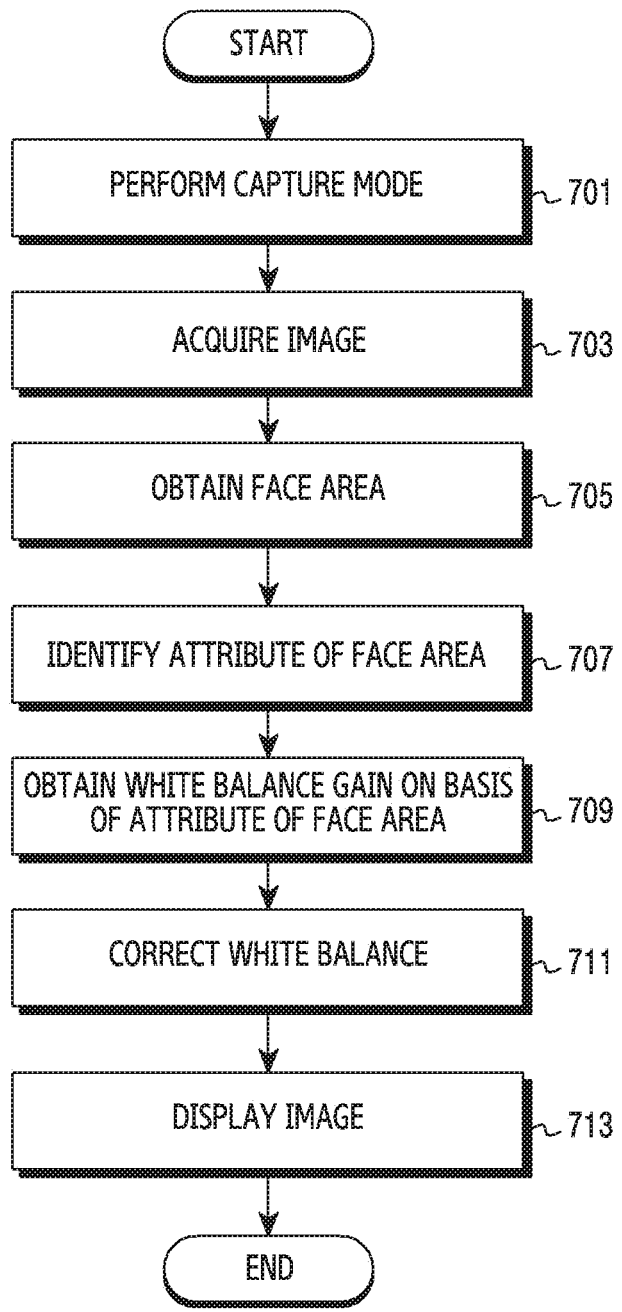
FIG. 7 is a flowchart illustrating an operation method of an electronic device according to various exemplary embodiments of the present invention.

FIG. 7 is a flowchart illustrating an operation method of an electronic device according to various embodiments of the present disclosure.

Referring to FIG. 7, in various embodiments, FIG. 7 may represent an example of when performing image capturing in the electronic device, obtaining a white balance gain on the basis of an attribute (e.g., a human race) of a face area, to correct white balance.

In operation 701, a processor (e.g., one or more processors including a processing circuitry) (e.g., the processor 120 or 210 of FIG. 1 or FIG. 2 and below, the processor 210) of the electronic device (e.g., the electronic device 101 or 201 of FIG. 1 or FIG. 2) may perform a capture mode. According to an embodiment, the processor 210 may enter the capture mode on the basis of obtaining the execution of an application of capturing an image by using a camera (e.g., the camera module 291 of FIG. 2) on the basis of a user input.

In operation 703, the processor 210 may acquire an image. According to an embodiment, the processor 210 may acquire an image forwarded through the camera module 291.

In operation 705, the processor 210 may obtain a face area from the acquired image. In various embodiments, the processor 210 may divide a face area and a background area in the image, on the basis of various face detection (or face recognition) technologies (or algorithms). According to an embodiment, the processor 210 may obtain the face area in a manner of obtaining positions, sizes or the like of feature points.

In operation 707, the processor 210 may identify an attribute of the face area. In various embodiments, the attribute of the face area may include a human race corresponding to a user face corresponding to the face area in the image. According to an embodiment, the processor 210 may identify the attribute on the basis of a color information (e.g., brightness information, an RGB, a color temperature, etc.) ratio of the face area. For example, in response to the color information ratio of the face area being equal to or being less than a set first reference value, the processor 210 may identify as a first attribute (e.g., the black), and in response to the color information ratio of the face area being equal to or being greater than a set second reference value, the processor 210 may identify as a second attribute (e.g., the yellow/the white). In accordance with various embodiments, an example of dividing an attribute of a face area is described in detail with reference to the drawings depicted later.

In operation 709, the processor 210 may obtain a white balance gain on the basis of the attribute of the face area. According to various embodiments, the processor 210 may acquire the final white balance gain on the basis of a first gain (e.g., a white balance gain associated with the entire image), a second gain (e.g., a white balance gain associated with a face area of an image), and an attribute ratio (or a weight) of an attribute. In various embodiments, the attribute ratio may represent a white balance (WB) gain offset corresponding to a first attribute (e.g., the black) or a second attribute (e.g., the yellow/the white). In accordance with various embodiments, an example of obtaining the final white balance gain is described in detail with reference to the drawings depicted later.

In operation 711, the processor 210 may correct white balance on the basis of the obtained white balance gain.

In operation 713, the processor 210 may display the image through the display on the basis of the corrected white balance.

Figure 8:
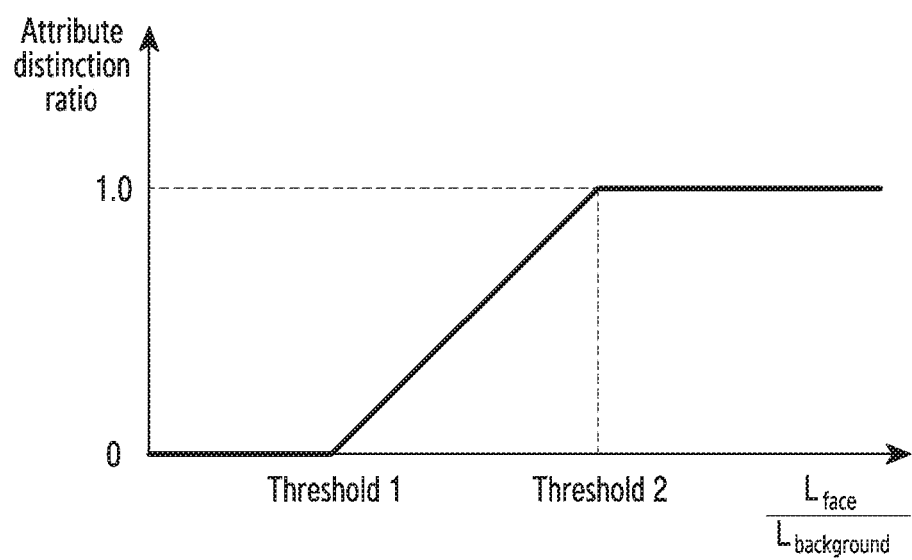
FIG. 8 is a diagram illustrating to explain an example of dividing an attribute of a face area in various embodiments of the present disclosure.

FIG. 8 is a diagram illustrating to explain an example of dividing an attribute of a face area in various embodiments of the present disclosure.

Generally, because the skin color may be altered according to the lighting environment, etc., dividing a human race by the skin color may deteriorate accuracy. Also, because the yellow and the white may have a similar skin color, the accuracy of dividing the yellow and the white may be lowered. Therefore, in various embodiments, dividing the first attribute (e.g., the black) and the second attribute (e.g., the yellow/the white) is mainly taken as an example.

Referring to FIG. 8, in various embodiments, a first reference value (e.g., Threshold 1) for distinguishing the first attribute and a second reference value (e.g., Threshold 2) for distinguishing the second attribute.

According to an embodiment, the first attribute (e.g., the black) may be relatively dark in brightness compared to the second attribute (e.g., the yellow/the white). In various embodiments, an example may be taken in which an attribute distinction ratio of the first attribute may be set as '0', and an attribute distinction ratio of the second attribute may be set as '1'.

In various embodiments, an attribute may be distinguished by using a color information (e.g., brightness information, an RGB, a color temperature, etc.) ratio between a background area and a face area in an image. According to an embodiment, the first attribute (e.g., the black) may be dark in brightness compared to the second attribute (e.g., the yellow/the white) and therefore, in various embodiments, the attribute may be distinguished by using input data (e.g., RGB statistics data) for white balance adjustment. According to an embodiment, the electronic device may obtain an attribute ratio by using a ratio (e.g., Equation 1 below) of first data (e.g., color information (e.g., the entire image brightness) corresponding to the entire image) of the entire image excepting a face area in an image and second data (e.g., color information (e.g., a face area brightness) corresponding to the face area) of the face area in the image.

$$HRR = \frac{L_{face}}{L_{background}}$$

In <Equation 1>, the 'HRR' may denote an attribute (human race) ratio (below, an attribute ratio), and the '$L_{background}$' (e.g., RGB stat.$_{background}$) may denote color information (e.g., the entire image brightness) corresponding to the entire image, and the '$L_{face}$' (e.g., RGB stat.$_{face}$) may denote color information (e.g., a face area brightness) corresponding to the face area in the image.

In various embodiments, input data (e.g., RGB statistics data) may normalize a brightness to a standard light source (e.g., a light source having similar spectrum with the solar light), in each of a face area and a face area exception area (e.g., the background area), to convert into a value (L) capable of indicating brightness information. The normalization may be performed by multiplying, by the input data (e.g., the RGB statistics data), a normalization gain for making, at 1:1:1, a RAW RGB of a gray patch of the standard color chart (e.g., the Macbeth chart) captured under the standard light source. For example, the normalization may be performed as in <Equation 2> below.

R'=normalization gain R*input R

G'=normalization gain G*input G

B'=normalization gain B*input B  Equation 2

According to various embodiments, the final brightness value (L) may be obtained, as in an example of <Equation 3> below, on the basis of the brightness information obtained as in <Equation 2>. For example, the R', the G', and the B' may be processed by weighted summation as in <Equation 3> and be used.

L=(R'+2G'+B')/4  Equation 3

According to various embodiments, the electronic device may compare and analyze whether a color information ratio corresponds to a first reference value, or corresponds to a second reference value, by using the color information ratio (HRR) between the background area and the face area obtained on the basis of the first data and the second data. According to various embodiments, the electronic device may identify an attribute (e.g., a human race) on the basis of the reference value matching with the color information ratio. According to an embodiment, in response to the color information ratio being equal to or being less than the first reference value, the electronic device may distinguish as the first attribute (e.g., the black) and in response to the color information ratio being equal to or being greater than the second reference value, the electronic device may distinguish as the second attribute (e.g., the yellow/the white).

According to various embodiments, in response to the color information ratio not corresponding to the first reference value or the second reference value, for example, in response to the color information ratio being a value that exists between the first reference value and the second reference value (e.g., in response to having a middle ratio value), the electronic device may identify as a third attribute (e.g., middle color information between color information of the black and the yellow/the white), by using the interpolation.

According to various embodiments, the electronic device may set to have a specific attribute ratio (the first attribute or the second attribute) regardless of a brightness at the first reference value or less or the second reference value or more, and have the third attribute as the attribute ratio by the interpolation of the first attribute and the second attribute, at a middle value between the first reference value and the second reference value.

According to various embodiments, the electronic device may store and manage, as a white balance correction parameter, a white balance gain offset (e.g., a first weight) corresponding to the first attribute (e.g., the black), a white balance gain offset (e.g., a second weight) corresponding to the second attribute (e.g., the yellow/the white), etc. For example, the electronic device may multiply a white balance gain (e.g., a second gain) obtained from face based white balance and a white balance gain offset (e.g., a weight) of a corresponding attribute, to obtain the final white balance gain (e.g., the final correction value).

On the other hand, at image capturing, there may be backlight. For example, the backlight may make a background area bright and a face area dark in an image. In this case, it may happen that although substantially being a second attribute (e.g., the yellow/the white), an object of the face area in the image is not recognized as the second attribute, and is obtained as a first attribute (e.g., the black). Therefore, in various embodiments, a reference value for distinguishing the attribute may be adjusted in consideration of a backlight ratio. Regarding this, a description is made with reference to FIG. 9 and FIG. 10.

Figure 9:
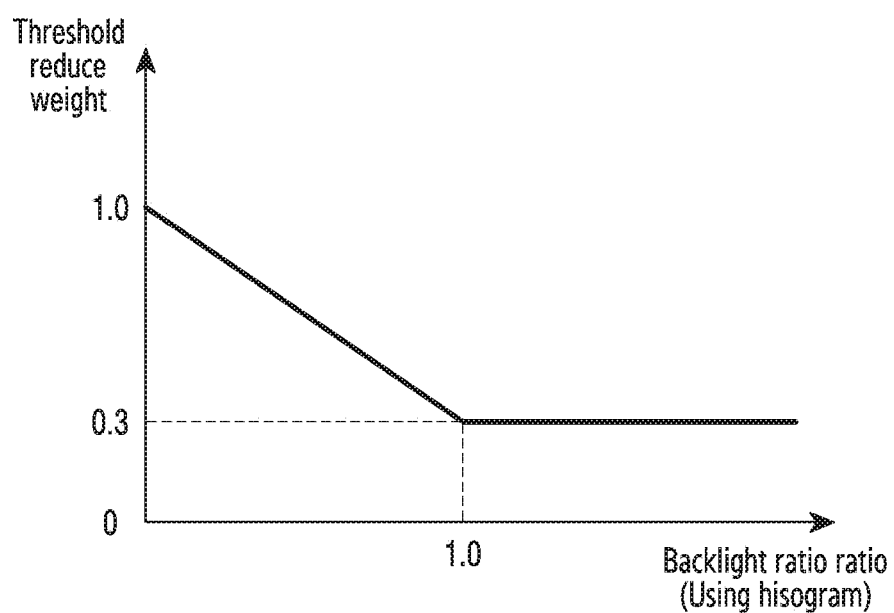
FIG. 9 and FIG. 10 are diagrams illustrating to explain an example of setting a reference value for attribute division in consideration of backlight in various embodiments of the present disclosure.
Figure 10:
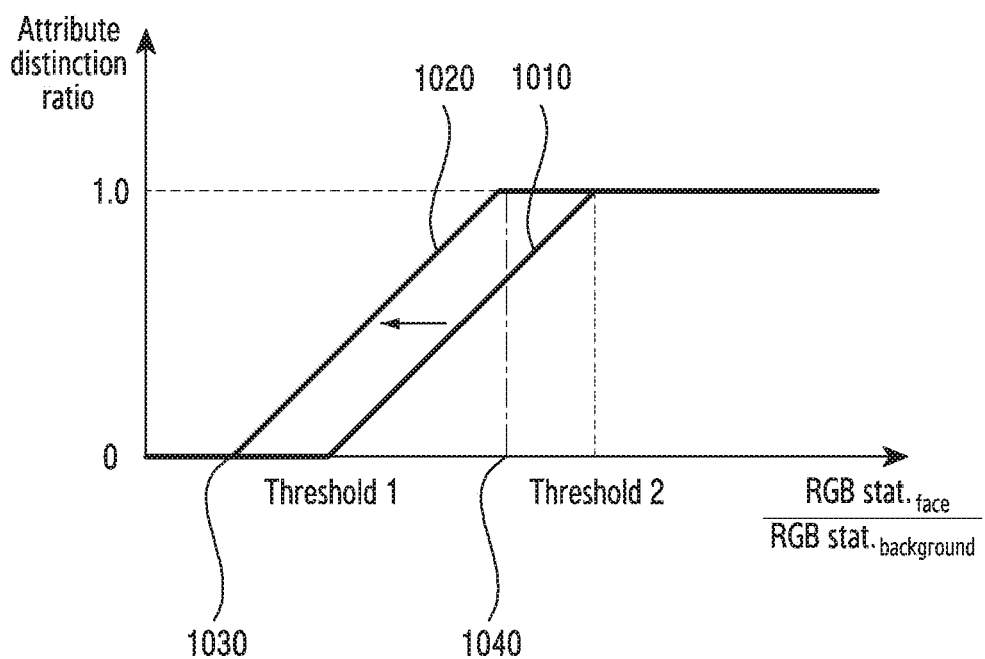

FIG. 9 and FIG. 10 are diagrams illustrating to explain an example of setting a reference value for attribute division in consideration of backlight in various embodiments of the present disclosure.

As illustrated in FIG. 9, according to various embodiments, a backlight ratio may be reflected on a reference value for attribute division. For example, an electronic device may set a threshold reduce weight for altering the reference value according to the backlight ratio. According to various embodiments, the backlight ratio may be obtained using a histogram. The histogram may represent the distribution of pixels from a dark portion of an image to a bright portion. According to an embodiment, a horizontal axis of the histogram graph, which is a brightness of the image, may include a range of 0 to 255, and may represent a state in which the image is dark as it goes to 0 and the image is bright as it goes to 255.

Accordingly, in various embodiments, by reflecting the backlight ratio using the histogram data on the reference value (e.g., the first reference value for first attribute distinction and the second reference value for second attribute distinction), the final reference value for attribute division may be set as in <Equation 4> below.

$F_{TH}$=Threshold*Reduce weight   Equation 4

In <Equation 4>, the '$F_{TH}$' may denote the final reference value, and the 'Threshold' may denote a reference value basically set according to an attribute, and the 'Reduce weight' may denote a reference value reduce weight of a backlight ratio. According to an embodiment, each of the first reference value for first attribute distinction and the second reference value for second attribute distinction may be altered (e.g., decreased) as much as the Reduce weight according to the Reduce weight. An example of this is illustrated in FIG. 10.

As illustrated in FIG. 10, an element 1010 may refer to a reference value (e.g., the first reference value or the second reference value) dependent on an attribute distinction ratio of a state in which the backlight ratio is not considered, and an element 1020 may refer to a reference value (e.g., a third reference value or a fourth reference value) dependent on an attribute distinction ratio of a state in which the backlight ratio is considered.

Referring to FIG. 10, when the final value is set based on the element 1020 according to the backlight ratio, the existing first reference value for distinguishing the first attribute (e.g., the black) may be altered into the third reference value (1030), and the second reference value for distinguishing the second attribute (e.g., the yellow/the white) may be altered into the fourth reference value (1040). Through this, in various embodiments, although backlight exists, the second attribute of the face area may be prevented from being falsely recognized as the first attribute.

Figure 11:
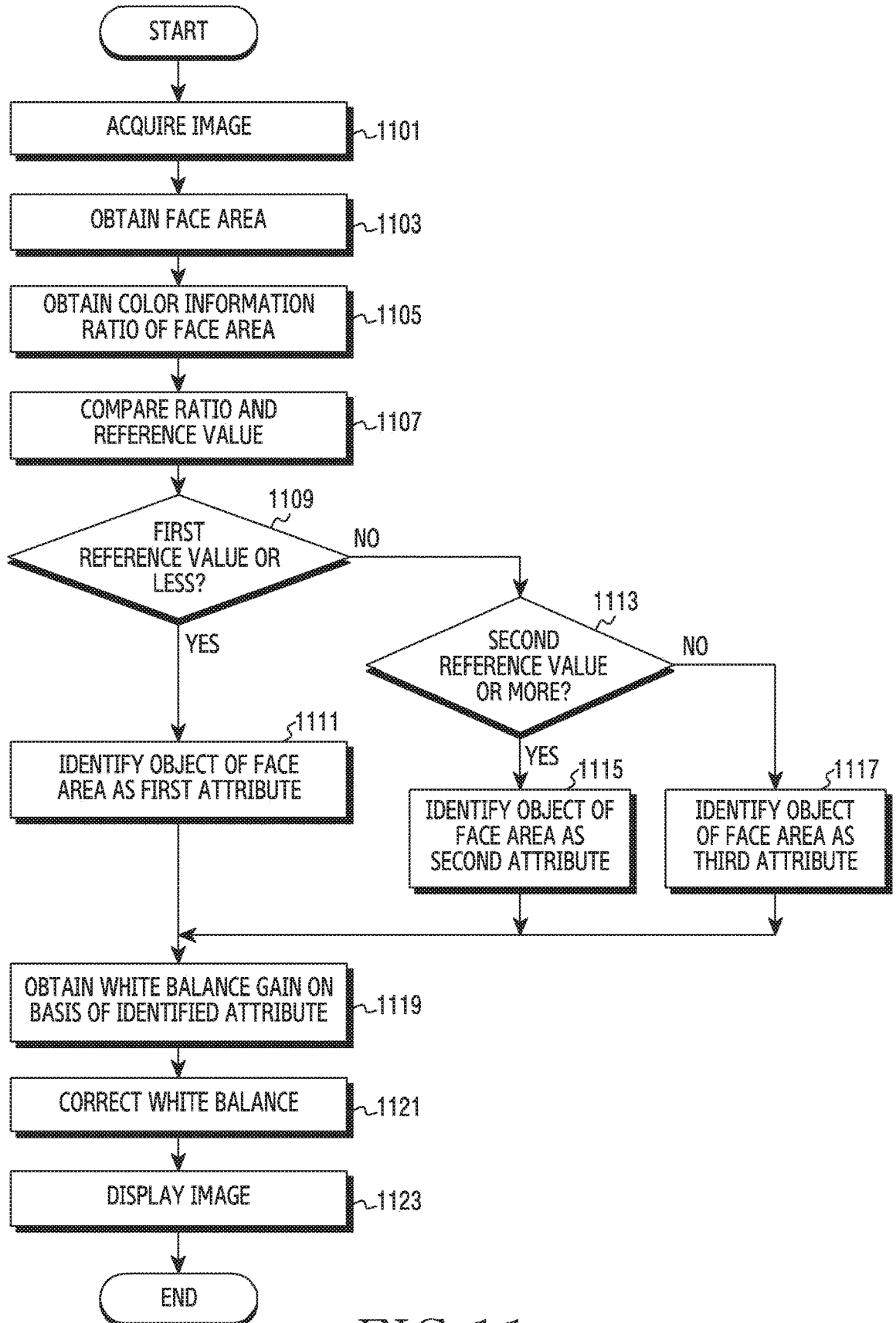
FIG. 11 is a flowchart illustrating an operation method of an electronic device according to various embodiments of the present disclosure.

FIG. 11 is a flowchart illustrating an operation method of an electronic device according to various embodiments of the present disclosure.

Referring to FIG. 11, in various embodiments, FIG. 11 may represent an example in which the electronic device obtains an attribute (e.g., a human race) of a face area from an acquired image, and obtains the final white balance gain on the basis of the attribute of the face area, to display the image.

In operation 1101, a processor (e.g., the processor 120 or 210 of FIG. 1 or FIG. 2 and below, the processor 210) of the electronic device (e.g., the electronic device 101 or 201 of FIG. 1 or FIG. 2) may acquire an image. According to an embodiment, the processor 210 may acquire an image forwarded through the camera module 291. In various embodiments, the acquired image may include one or more objects, and may be a preview image for displaying in real time through a display.

In operation 1103, the processor 210 may obtain a face area from the acquired image. In various embodiments, the processor 210 may divide a face area and a background area in the image, on the basis of various face detection technologies (or algorithms).

In operation 1105, the processor 210 may obtain a color information ratio of the face area. According to an embodiment, the processor 210 may obtain a ratio (e.g., a color information ratio) of first data (e.g., color information corresponding to the entire image) related with a background area excepting the face area in the image and second data (e.g., color information corresponding to the face area) related with the face area in the image.

In operation 1107, the processor 210 may compare the color information ratio and a reference value. According to an embodiment, the processor 210 may compare the identified attribute distinction ratio with a first reference value for a first attribute, a second reference value for a second attribute, and a third reference value for a third attribute. According to an embodiment, the processor 210 may identify an attribute (e.g., an attribute distinction ratio) of the color information ratio, by using the aforementioned <Equation 1>.

In various embodiments, the processor 210 may identify whether the color information ratio is included in the first reference value or less, or is included in the second reference value or more, or is included between the first reference value and the second reference value, on the basis of the comparing result. For example, operation 1109 and operation 1113 may be performed. In various embodiments, operation 1109 and operation 1113 are not limited to the illustrated sequence, and may be performed in sequence, in reverse sequence, or in parallel.

In operation 1109, the processor 210 may identify whether the color information ratio is included in the first reference value or less.

In response to it being identified that the color information ratio is included in the first reference value or less in operation 1109 (Yes of operation 1109), in operation 1111, the processor 210 may identify an object of the face area as the first attribute.

In response to the color information ratio not being included in the first reference value or less in operation 1109 (No of operation 1109), in operation 1113, the processor 210 may identify whether the color information ratio is included in the second reference value or more.

In response to it being identified that the color information ratio is included in the second reference value or more in operation 1113 (Yes of operation 1113), in operation 1115, the processor 210 may identify the object of the face area as the second attribute.

In response to the color information ratio not being included in the second reference value or more in operation 1113 (No of operation 1113), in operation 1117, the processor 210 may identify the object of the face area as the third attribute. According to an embodiment, the processor 210 may identify that the color information ratio exists between the first reference value and the second reference value, and identify that the object of the face area is the third attribute which is a middle attribute between the first attribute and the second attribute. According to various embodiments, in response to the color information ratio existing between the first reference value and the second reference value, the processor 210 may provide the third attribute by the interpolation of the first attribute and the second attribute.

In operation 1119, the processor 210 may obtain a white balance gain on the basis of the identified attribute. According to an embodiment, the processor 210 may identify a white balance gain offset (e.g., a weight) of the first attribute, second attribute or third attribute identified in operation 1111, operation 1115, or operation 1117. By multiplying a face based white balance gain by the white balance gain offset, the processor 210 may obtain the final white balance gain (e.g., the final correction value).

In operation 1121, the processor 210 may correct white balance on the basis of the obtained white balance gain. According to an embodiment, the processor 210 may obtain auto white balance (AWB) of the face area, and multiply the auto white balance by a first correction value corresponding to the first attribute, to correct white balance on the basis of a first level, or multiply the auto white balance by a second correction value corresponding to the second attribute, to correct the white balance on the basis of a second level.

In operation 1123, the processor 210 may display the image through the display on the basis of the corrected white balance.

Figure 12:
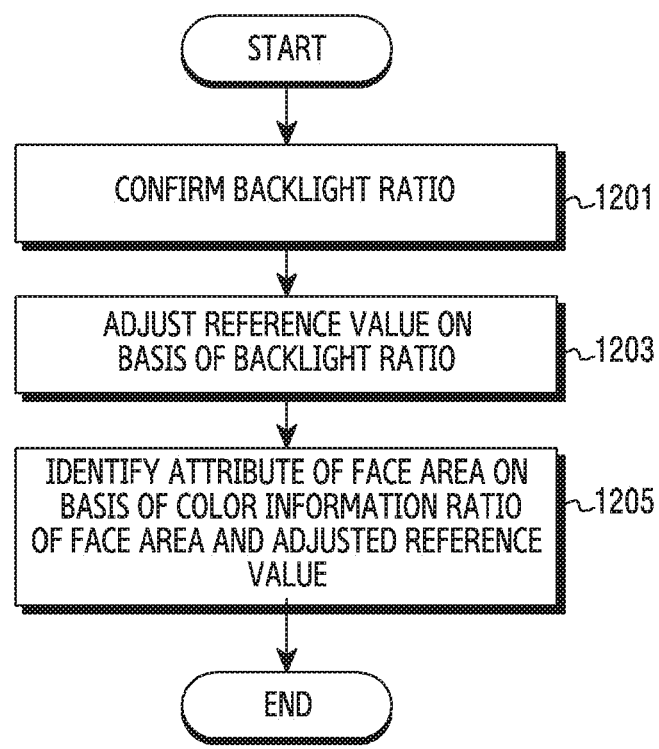
FIG. 12 is a flowchart illustrating an operation method of an electronic device according to various embodiments of the present disclosure.

FIG. 12 is a flowchart illustrating an operation method of an electronic device according to various embodiments of the present disclosure.

Referring to FIG. 12, in various embodiments, FIG. 12 may represent an example of altering a reference value of brightness information for attribute division according to a backlight (e.g., a state in which a background area is bright and a face area is dark) condition (e.g., a backlight ratio) of an image, and identifying an attribute on the basis of the altered reference value.

In operation 1201, the processor 210 of the electronic device may confirm a backlight ratio in an image. According to an embodiment, the processor 210 may identify the backlight ratio by using histogram data.

In operation 1203, the processor 210 may adjust a reference value, based on the backlight ratio. According to an embodiment, as taking the aforementioned <Equation 4> as an example, the processor 210 may multiply, by the reference value, a Threshold reduce weight for altering a reference value according to the backlight ratio, to set the final reference value.

In operation 1205, the processor 210 may identify an attribute of a face area on the basis of a color information ratio of the face area and the adjusted reference value.

Figure 13:
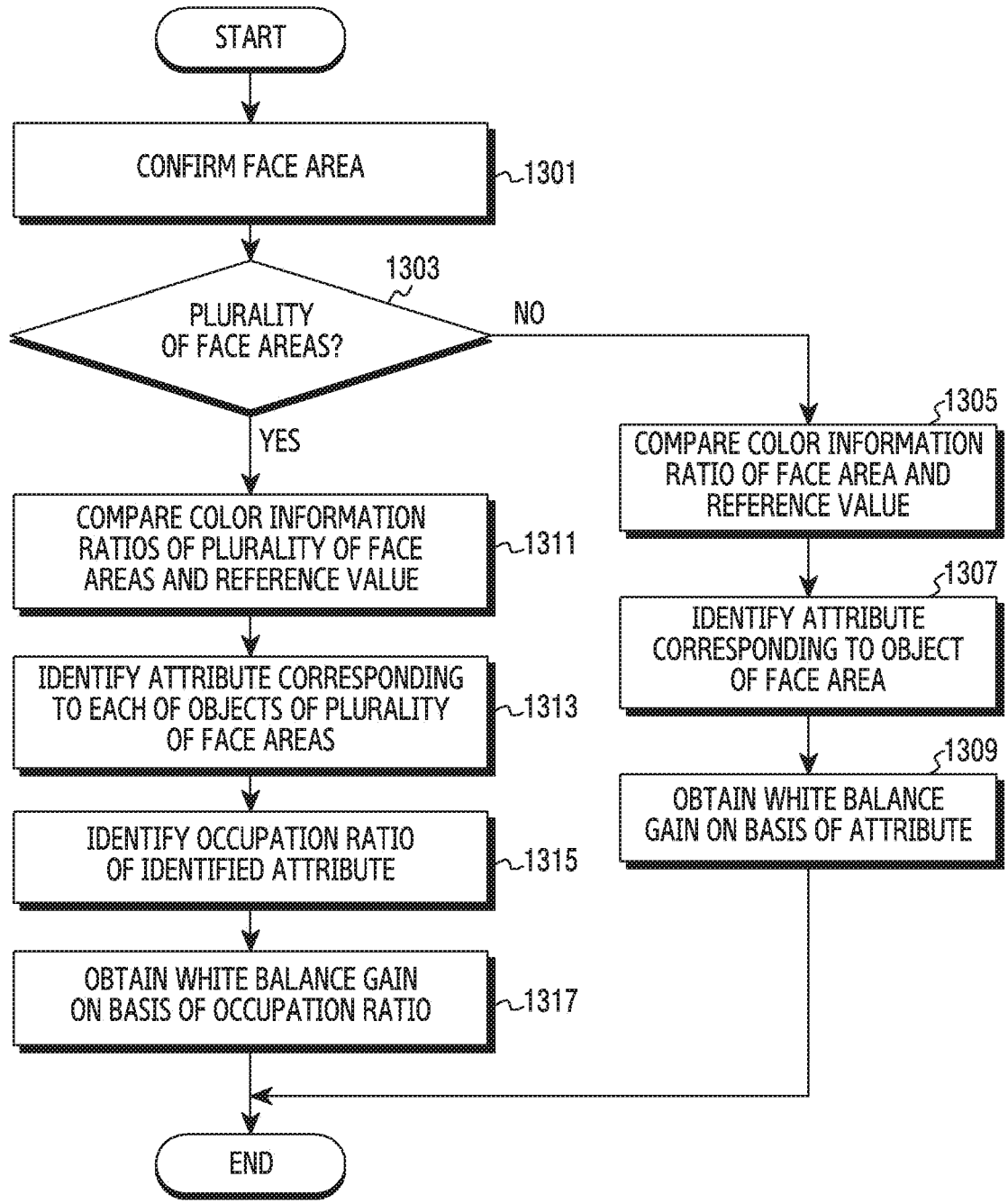
FIG. 13 is a flowchart illustrating an operation method of an electronic device according to various embodiments of the present disclosure.

FIG. 13 is a flowchart illustrating an operation method of an electronic device according to various embodiments of the present disclosure.

Referring to FIG. 13, in various embodiment, FIG. 13 may represent an example of in response to an image including a plurality of face areas, identifying a white balance gain offset (e.g., a weight) on the basis of the plurality of face areas, and obtaining the final white balance gain on the basis of the identified white balance gain offset.

In operation 1301, the processor 210 of the electronic device may confirm a face area in an image. According to an embodiment, the processor 210 may obtain the face area from the image, and identify the number of the obtained face areas. According to an embodiment, the processor 210 may analyze face association information related with a face count and a face position, etc., in the image. In various embodiments, the face association information may be analyzed and provided by the face obtaining unit as well.

In operation 1303, the processor 210 may identify whether a plurality of face areas are included in the image on the basis of the confirming result.

In response to it being identified that the face area obtained from the image not being the plurality of face areas in operation 1303 (No of operation 1303), in operation 1305, the processor 210 may compare a color information ratio of the face area and a reference value. In accordance with an embodiment, the processor 210 may obtain the color information ratio of the face area on the basis of a background area and the face area as mentioned above, and compare the obtained color information ratio with a reference value (e.g., a first reference value for a first attribute, a second reference value for a second attribute, etc.) for attribute distinction.

In operation 1307, the processor 210 may identify an attribute corresponding to an object of the face area on the basis of the comparing result. According to an embodiment, in response to the color information ratio being included in the first reference value or less, the processor 210 may identify a first attribute, and in response to the color information ratio being included in the second reference value or more, the processor 210 may identify a second attribute, and in response to the color information ratio being included between the first reference value and the second reference value, the processor 210 may identify a third attribute.

In operation 1309, the processor 210 may obtain a white balance gain on the basis of the identified attribute. According to an embodiment, the processor 210 may identify a white balance gain offset (e.g., a weight) of the identified first attribute, second attribute, or third attribute. The processor 210 may multiply a face based white balance gain by the identified white balance gain offset, to obtain the final white balance gain (e.g., the final correction value).

In response to it being identified that the face area obtained from the image is the plurality of face areas in operation 1303 (Yes of operation 1303), in operation 1311, the processor 210 may compare color information ratios of the plurality of face areas and a reference value. According to an embodiment, the processor 210 may obtain each of the color information ratios corresponding the plurality of face areas such as a first face area, a second face area, a third face area, etc., in the image, and compare the obtained each color information ratio with a reference value for attribute distinction (e.g., a first reference value for a first attribute, a second reference value for a second attribute, etc.).

In operation 1313, the processor 210 may identify at least one attribute corresponding to the plurality of face areas on the basis of the comparing result. According to an embodiment, the processor 210 may identify, as the first attribute, at least one face area whose color information ratio is included in the first reference value or less among the plurality of face areas, and may identify, as the second attribute, at least one face area whose color information ratio is included in the first reference value or more in the plurality of face areas, and may identify, as the third attribute, at least one face area whose color information ratio is included between the first reference value and the second reference value in the plurality of face areas.

In operation 1315, the processor 210 may identify an occupation ratio (or a count ratio) of the identified attribute. According to an embodiment, in response to at least one first attribute and at least one second attribute being identified based on the plurality of face areas, the processor 210 may obtain a ratio in which the first attribute and the second attribute occupy in the plurality of face areas. For example, the processor 210 may obtain a count ratio of face areas corresponding to the identified first attribute among the plurality of face areas and face areas corresponding to the identified second attribute. In accordance with an embodiment, it may be assumed that the plurality of face areas are equal to five in number, and face areas having an object of the first attribute among the five plurality of faces area are equal to three in number, and face areas having an object of the second attribute are equal to two in number. The processor 210 may identify that a ratio (or a count ratio) in which the first attribute relatively occupies compared to the second attribute is high.

In operation 1317, the processor 210 may obtain a white balance gain on the basis of the occupation ratio (or the count ratio) of the attribute (e.g., the first attribute and the second attribute). According to an embodiment, the processor 210 may identify a white balance gain offset (e.g., a weight) dependent on an attribute of a high occupation ratio. According to an embodiment, the processor 210 may differentially identify the white balance gain offset (e.g., the weight) according to the extent of the occupation ratio as well. The processor 210 may multiply a face based white balance gain by the obtained white balance gain offset, to obtain the final white balance gain (e.g., the final correction value).

Figure 14:
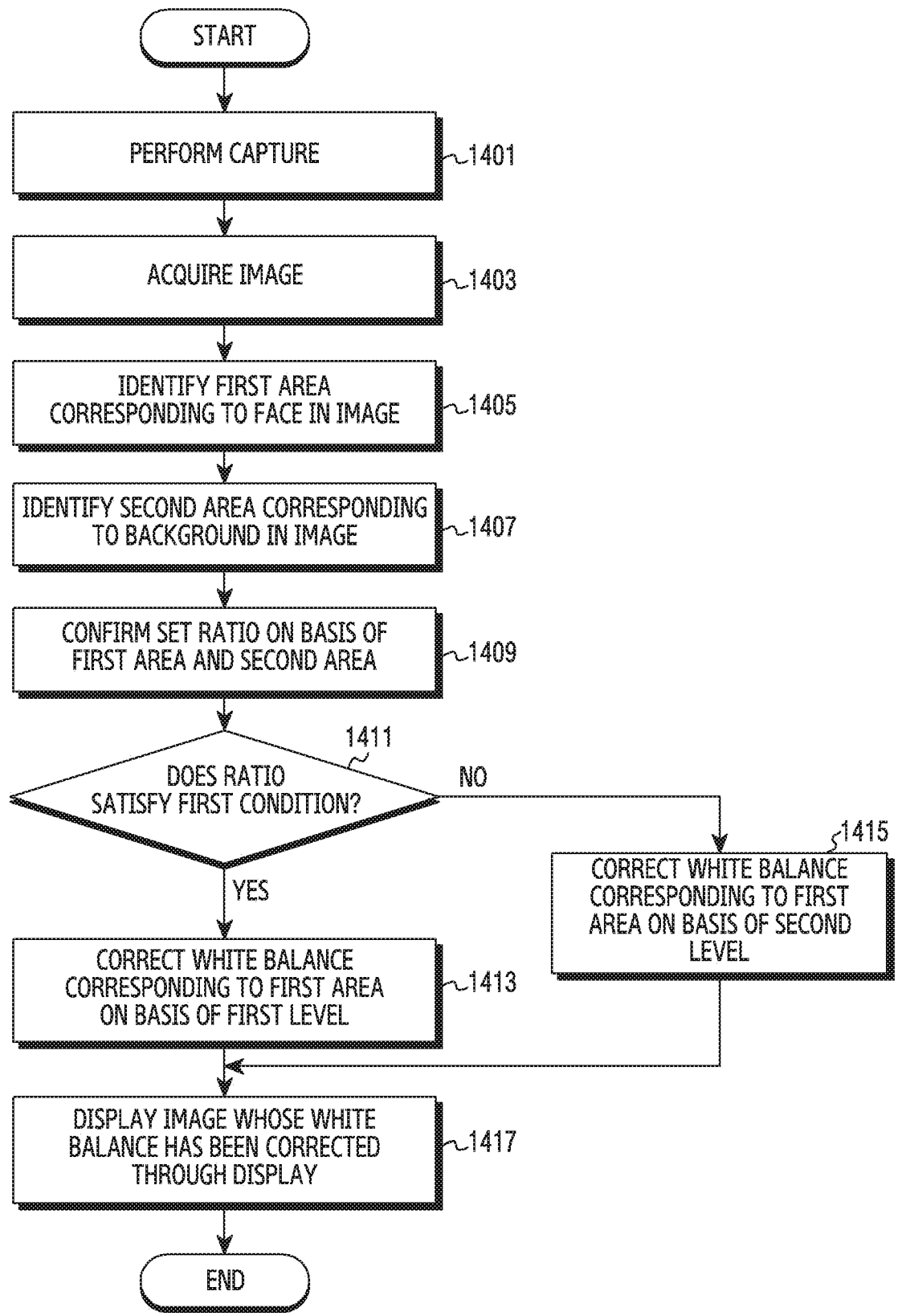
FIG. 14 is a flowchart illustrating an operation method of an electronic device according to various embodiments of the present disclosure.

FIG. 14 is a flowchart illustrating an operation method of an electronic device according to various embodiments of the present disclosure.

Referring to FIG. 14, in various embodiments, FIG. 14 may represent an example in which the electronic device divides a face area and a background area in an acquired image, and identifies a set ratio (e.g., color information ratio) on the basis of the face area and the background area, and corrects white balance according to a specified condition (e.g., a first attribute and/or a second attribute) in which the set ratio is satisfied.

In operation 1401, the processor 210 of the electronic device may perform image capturing in a capture mode.

In operation 1403, the processor 210 may acquire an image on the basis of the image capturing. According to an embodiment, the processor 210 may acquire an image forwarded through the camera module 291. In various embodiments, the acquired image may include one or more objects, and may be a preview image for displaying in real time through a display.

In operation 1405, the processor 210 may identify a first area (e.g., a face area) corresponding to a face among the one or more objects in the image.

In operation 1407, the processor 210 may identify a second area (e.g., a background area) corresponding to the background among the one or more objects in the image.

In operation 1409, the processor 210 may confirm a set ratio on the basis of the first area and the second area. According to an embodiment, the processor 210 may confirm a ratio between color information of the first area and color information of the second area. In various embodiments, the color information may, for example, include at least one of brightness information, an RGB, or a color temperature, etc.

In operation 1411, the processor 210 may identify whether the ratio satisfies a set first condition. According to an embodiment, the processor 210 may identify whether the ratio corresponds to a first reference value for distinguishing an attribute corresponding to an object of the first area.

In response to the ratio satisfying the first condition in operation 1411 (Yes of operation 1411), in operation 1413, the processor 210 may correct white balance corresponding to the first area on the basis of a first level. According to an embodiment, the processor 210 may multiply auto white balance (AWB) (e.g., a face based white balance) corresponding to the first area by a first correction value corresponding to the first condition (e.g., a white balance gain offset (e.g., a first weight) specified to the first condition), to correct white balance on the basis of the obtained first level.

In response to the ratio satisfying a second condition in operation 1411 (No of operation 1411), in operation 1415, the processor 210 may correct white balance corresponding to the first area on the basis of a second level. According to an embodiment, the processor 210 may multiply the auto white balance (AWB) corresponding to the first area, by a second correction value corresponding to the second condition (e.g., a white balance gain offset (e.g., a second weight) specified to the second condition), to correct white balance on the basis of the obtained second level.

In operation 1417, the processor 210 may control to display, through a display, an image whose white balance corresponding to the first area is corrected into corresponding one level among the first level and the second level.

According to various embodiments, the processor 210 may identify a backlight ratio on the basis of histogram data obtained from the image, and correct white balance corresponding to the first area by using the identified backlight ratio as well.

Figure 15:
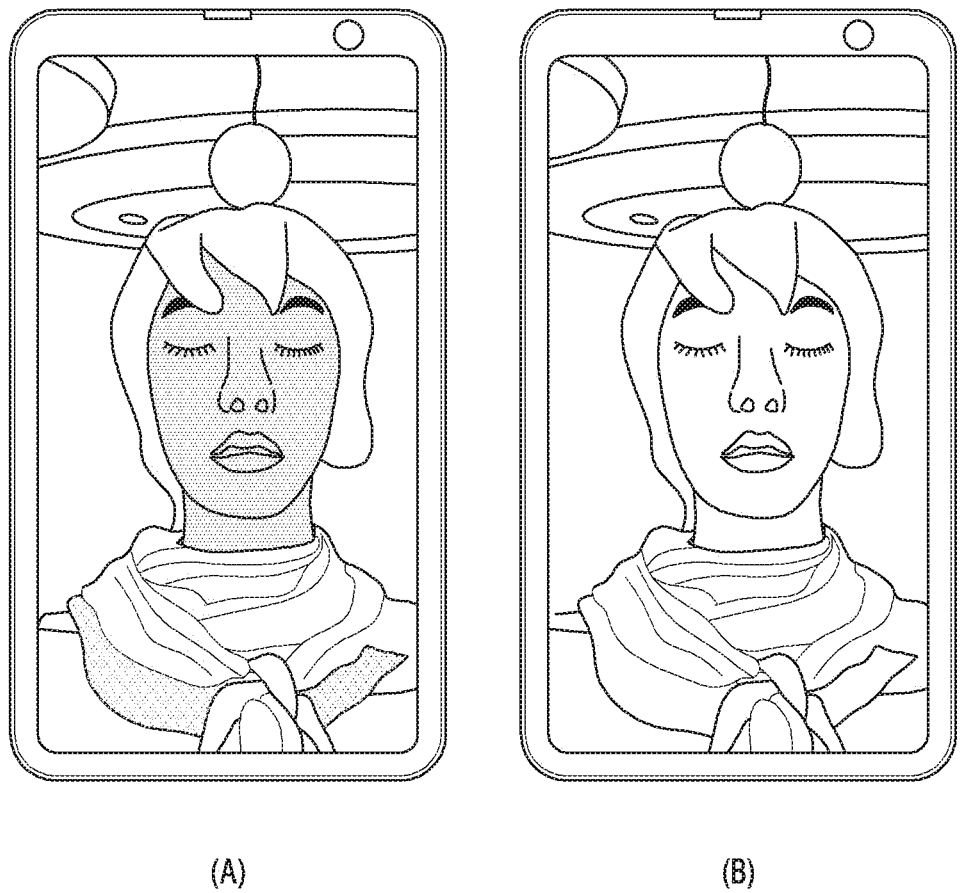
FIG. 15 is a diagram illustrating an example of a white balance correction result in an electronic device according to various embodiments of the present disclosure.

FIG. 15 is a diagram illustrating an example of a white balance correction result in an electronic device according to various embodiments of the present disclosure.

Referring to FIG. 15, an example (A) of FIG. 15 may represent an example of an image not employing a white balance correction function of various embodiments, and an example (B) of FIG. 15 may represent an example of an image employing the white balance correction function of various embodiments.

As illustrated in FIG. 15, compared to the image before white balance correction of the example (A), the image after white balance correction of the example (B) may be expressed closer to the real face color.

As taking a look above, an operation method of an electronic device of various embodiments may include acquiring an image including one or more objects, identifying a first area corresponding to a face among the one or more objects in the image, identifying a second area corresponding to the background among the one or more objects, confirming a ratio between color information of the first area and color information of the second area, correcting, on the basis of a first level, white balance corresponding to the first area in response to the ratio satisfying a set first condition, correcting, on the basis of a second level, the white balance corresponding to the first area in response to the ratio satisfying a set second condition, and displaying, through the display, the image of which the white balance corresponding to the first area has been corrected on the basis of corresponding one level among the first level and the second level.

In accordance with various embodiments, the correcting may include identifying a backlight ratio in the image, and correcting the white balance corresponding to the first area, by more using the backlight ratio.

In accordance with various embodiments, the identifying of the backlight ratio may include identifying the backlight ratio on the basis of histogram data obtained from the image.

In accordance with various embodiments, the correcting may include obtaining a reduce weight for altering the first condition and the second condition according to the backlight ratio, and obtaining a third condition and a fourth condition by using the reduce weight, and include correcting the white balance corresponding to the first area on the basis of the first level in response to the ratio satisfying an altered third condition, and correcting the white balance corresponding to the first area on the basis of the second level in response to the ratio satisfying an altered fourth condition.

In accordance with various embodiments, the correcting may include obtaining auto white balance (AWB) of the first area, as a part of the correcting operation, and multiplying the auto white balance by a first correction value corresponding to the first specified condition, to correct on the basis of the first level, or multiply by a second correction value corresponding to the second specified condition, to correct on the basis of the second level.

Various embodiments of the present disclosure disclosed in the specification and drawings just merely suggest specific examples so as to easily explain the technological content of the present disclosure and assist the understanding of the present disclosure, and do not intend to limit the scope of the present disclosure. Accordingly, the scope of the present disclosure should be construed as including all modified or changed forms drawn on the basis of the technological spirit of the present disclosure besides the embodiments disclosed herein.

What is claimed is:

1. An electronic device comprising:
 a camera module;
 a display; and
 a processor functionally coupled with the camera module and the display,
 wherein the processor is configured to:
  acquire an image comprising a face object;
  divide a background area and a face area in the image;
  in response to a color information ratio of the face area being equal to or being less than a set first reference value, identify the object of the face area as a first attribute;
  in response to the color information ratio of the face area being equal to or being greater than a set second reference value, identify the object of the face area as a second attribute;
  identify a weight on the basis of the first attribute or the second attribute;
  correct the white balance on the basis of the weight; and
  display, through the display, the image on the basis of the corrected white balance.

2. The electronic device of claim 1, wherein the attribute of the face area comprises an index related to a human race or skin color corresponding to an object of the face area in the image.

3. The electronic device of claim 1, wherein the processor is further configured to:
 identify third white balance on the basis of a first white balance gain associated with the background area, a second white balance gain associated with the face area, and a weight of the attribute; and
 provide the image on the basis of the identified third white balance.

4. The electronic device of claim 1, wherein the processor is further configured to, in response to the color information ratio corresponding to between the first reference value and the second reference value, identify the object of the face area as a third attribute.

5. The electronic device of claim 1, wherein the processor is further configured to obtain the color information ratio, based further on color information corresponding to the background area.

6. The electronic device of claim 1, wherein the processor is further configured to alter a reference value of brightness information for attribute division according to a backlight ratio in the image, and identify the attribute on the basis of the altered reference value.

7. The electronic device of claim 6, wherein the processor is further configured to:
 obtain a reduce weight for altering the reference value according to the backlight ratio;
 obtain another reference value by using the reduce weight; and
 identify an attribute of the face area on the basis of the color information ratio of the face area and the other reference value.

8. The electronic device of claim 1, wherein the processor is further configured to:
 in response to the image comprising a plurality of face areas, compare color information ratios of the plurality of face areas and a reference value;
 identify a first attribute and a second attribute corresponding to the plurality of face areas, on the basis of the comparing result;
 obtain a count ratio of face areas corresponding to the identified first attribute and face areas corresponding to the identified second attribute among the plurality of face areas; and
 obtain a weight for white balance correction on the basis of the count ratio of the first attribute and the second attribute.

9. The electronic device of claim 8, wherein the processor is further configured to identify the weight on the basis of any one attribute of which the count ratio is high, or differentially identify the weight according to the extent of the count ratio.

* * * * *